US012572679B2

(12) United States Patent
Peng

(10) Patent No.: US 12,572,679 B2
(45) Date of Patent: Mar. 10, 2026

(54) DATA SECURITY PROCESSING METHOD AND APPARATUS

(71) Applicant: HUAWEI TECHNOLOGIES CO., LTD., Guangdong (CN)

(72) Inventor: Kun Peng, Shenzhen (CN)

(73) Assignee: Huawei Technologies Co., LTD.

( * ) Notice: Subject to any disclaimer, the term of this patent is extended or adjusted under 35 U.S.C. 154(b) by 103 days.

(21) Appl. No.: 18/440,463

(22) Filed: Feb. 13, 2024

(65) Prior Publication Data

US 2024/0184909 A1 Jun. 6, 2024

Related U.S. Application Data

(63) Continuation of application No. PCT/CN2022/085163, filed on Apr. 2, 2022.

(30) Foreign Application Priority Data

Aug. 20, 2021 (CN) .......................... 202110959582.X
Oct. 29, 2021 (CN) .......................... 202111274982.6

(51) Int. Cl.
*G06F 21/62* (2013.01)
*G06F 21/40* (2013.01)
*G06F 21/60* (2013.01)
*G06F 9/44* (2018.01)
*G06F 21/71* (2013.01)

(52) U.S. Cl.
CPC ........ *G06F 21/6218* (2013.01); *G06F 21/602* (2013.01)

(58) Field of Classification Search
None
See application file for complete search history.

(56) References Cited

U.S. PATENT DOCUMENTS

| | | | | |
|---|---|---|---|---|
| 5,940,507 A | * | 8/1999 | Cane | G06F 21/6218 713/193 |
| 9,396,349 B1 | * | 7/2016 | Berfeld | G06F 21/6209 |
| 10,230,529 B2 | * | 3/2019 | Costa | G06F 21/62 |

(Continued)

OTHER PUBLICATIONS

Ma et al., "Secure Multi-party Protocols for Privacy Preserving Data Mining," Proceedings of the Third International Conference on Wireless Algorithms, Systems, and Applications, Oct. 26, 2008, 12 pages.

(Continued)

*Primary Examiner* — Venkat Perungavoor
(74) *Attorney, Agent, or Firm* — Fish & Richardson P.C.

(57) ABSTRACT

Example data security processing methods and systems are disclosed. One example data security processing method includes determining n trusted applications (TAs) for a same computation task of m pieces of user equipment. Data sent by each of the m pieces of user equipment is received, where the data sent by each user equipment is used for performing the same computation task. A data fragment set of each TA of the n TAs participating in the computation is determined, where the data fragment set of each TA includes one data fragment in the data sent by each user equipment. Each TA is controlled to perform computation based on the data fragment set of each TA. A computation result of the same computation task is determined based on a computation result of each TA.

14 Claims, 11 Drawing Sheets

(56)                 References Cited

U.S. PATENT DOCUMENTS

| | | | |
|---|---|---|---|
| 11,157,626 B1 * | 10/2021 | Ratts ....................... | H04L 67/55 |
| 2015/0074392 A1 * | 3/2015 | Boivie ................ | G06F 21/6245 |
| | | | 713/164 |
| 2015/0098567 A1 * | 4/2015 | Park .................... | G06F 21/6272 |
| | | | 380/44 |
| 2020/0169421 A1 * | 5/2020 | Farkash ................ | H04L 63/062 |
| 2020/0274718 A1 * | 8/2020 | Hwang ................. | H04L 9/3239 |
| 2020/0327250 A1 * | 10/2020 | Wang ..................... | G06N 20/00 |
| 2021/0143993 A1 * | 5/2021 | Soryal ................. | G06F 21/6218 |
| 2024/0275588 A1 * | 8/2024 | Lee ....................... | H04L 9/0894 |

OTHER PUBLICATIONS

Koeberl et al., "Time to rethink: Trust brokerage using trusted execution environments," Proceedings of International Conference on Trust and Trustworthy Computing, Aug. 14, 2015, 10 pages.
Extended European Search Report in European Appln. No. 22857283. 0, mailed on Oct. 18, 2024, 6 pages.

\* cited by examiner

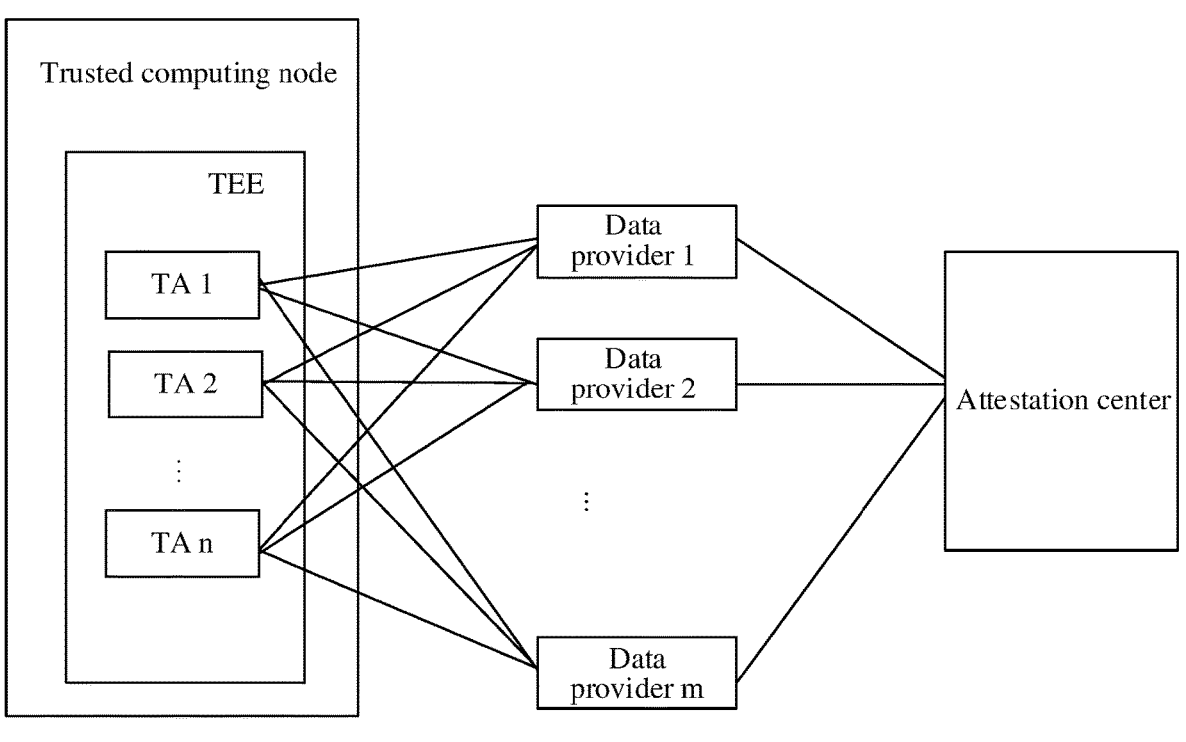

FIG. 6

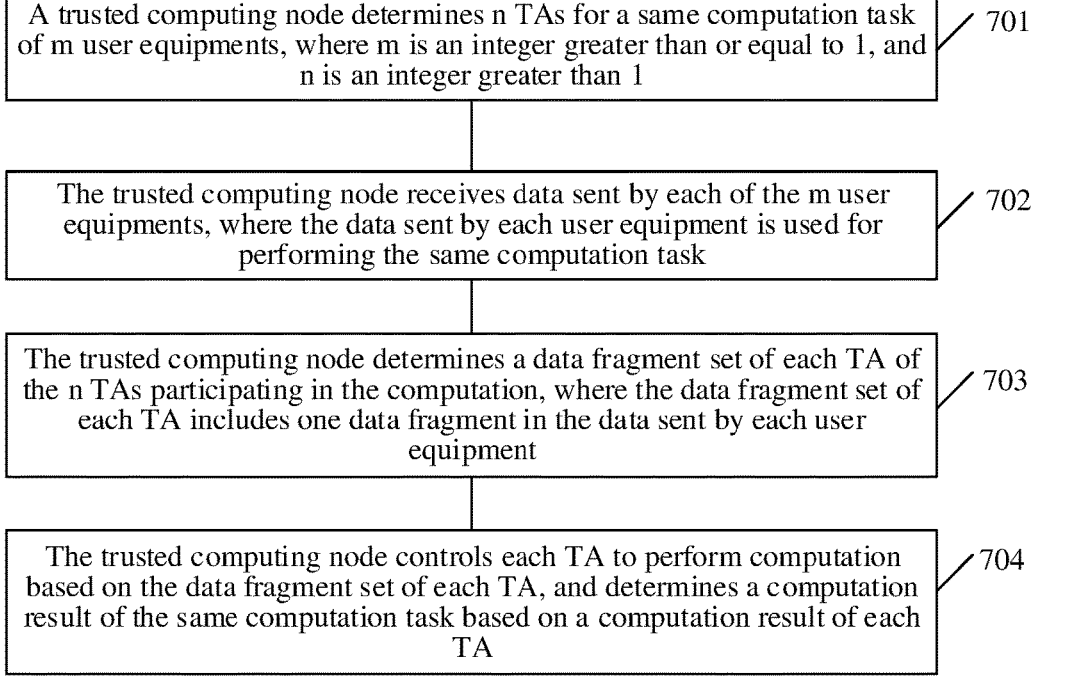

| A trusted computing node determines n TAs for a same computation task of m user equipments, where m is an integer greater than or equal to 1, and n is an integer greater than 1 | 701 |

| The trusted computing node receives data sent by each of the m user equipments, where the data sent by each user equipment is used for performing the same computation task | 702 |

| The trusted computing node determines a data fragment set of each TA of the n TAs participating in the computation, where the data fragment set of each TA includes one data fragment in the data sent by each user equipment | 703 |

| The trusted computing node controls each TA to perform computation based on the data fragment set of each TA, and determines a computation result of the same computation task based on a computation result of each TA | 704 |

FIG. 7

DATA SECURITY PROCESSING METHOD AND APPARATUS

CROSS-REFERENCE TO RELATED APPLICATIONS

This application is a continuation n of International Application No. PCT/CN2022/085163, filed on Apr. 2, 2022, which claims priority to Chinese Patent Application No. 202110959582.6, filed on Aug. 20, 2021, and Chinese Patent Application No. 202111274982.X, filed on Oct. 29, 2021. All of the aforementioned patent applications are hereby incorporated by reference in their entireties.

TECHNICAL FIELD

Embodiments of this application relate to the field of information technologies (Information Technology, IT), and in particular, to a data security processing method and an apparatus.

BACKGROUND

Trusted computing is an algorithm for secure computing and can protect user data from being accessed by another entity. When a user sends private data to a trusted computing node, a TEE may perform confidential computing on the private data by using a trusted application (Trusted Application, TA) corresponding to the user.

Therefore, the trusted computing can implement secure computation outsourcing. To be specific, a user without local computing power provides privacy data of the user to a computing power provider, for example, a trusted computing node in a cloud, and computation is performed using a TA generated by the trusted computing node for the user, to protect data privacy of the user. When a plurality of users send privacy data of the users to the computing power provider, and computation tasks corresponding to the users are different, the trusted computing node needs to generate, for each user, a TA corresponding to the user, to perform computation on privacy data of each user separately, so as to implement data isolation between the plurality of users. However, when a same computation task is performed using privacy data of a plurality of users, it is difficult for the trusted computing node to perform the computation task. Because the trusted computing node can only implement data isolation between different TAs, when the trusted computing node determines that a same computation task involves data of a plurality of users, it is impossible to implement data isolation between the plurality of users if the trusted computing node performs computation on the data of the plurality of users by using a same TA, so that reliability of trusted computing is reduced.

SUMMARY

Embodiments of this application provide a data security processing method and an apparatus, to ensure data security when a same computation task involves computing on data of a plurality of users in a trusted computing node, and improve computing efficiency.

To achieve the foregoing objectives, the following technical solutions are used in embodiments of this application.

According to a first aspect, a data security processing method is provided, including: A trusted computing node determines n trusted applications TAs for a same computation task of m user equipments, where m is an integer greater than or equal to 1, and n is an integer greater than 1; the trusted computing node receives data sent by each of the m user equipments, where the data sent by each user equipment is used for performing the same computation task; the trusted computing node determines a data fragment set of each TA of the n TAs participating in the computation, where the data fragment set of each TA includes one data fragment in the data sent by each user equipment; and the trusted computing node controls each TA to perform computation based on the data fragment set of each TA, and determines a computation result of the same computation task based on a computation result of each TA. The trusted computing node includes a TEE, and the method may be considered to be performed in the TEE.

In this way, for each TA in this application, computation on the data of the m user equipments is not performed in one TA, and each TA obtains only one data fragment in the data of each user equipment, but does not obtain complete data of any user equipment, so that data isolation between a plurality of users is well achieved, and data leakage is less likely to occur. Moreover, computation on the data of all user equipments is performed in one trusted computing node having a TEE, without involving third-party node-assisted computation. Therefore, computing efficiency is high.

In addition, in comparison with a secure multi-party computation solution, in this application, cross-network communication interaction originally performed between a plurality of computing nodes in secure multi-party computation is performed between TAs of a same trusted computing node, without a need for communication between the plurality of computing nodes, thereby increasing a computing speed. In addition, with no need to rely on a protocol of a specific application task of the secure multi-party computation, this application has relatively high universality.

In a possible design, the data sent by each user equipment includes n data fragments, and the data fragment set of each TA includes one of the n data fragments sent by each user equipment. To be specific, when the trusted computing node configures n TAs for the computation task, the user equipment may divide to-be-sent data into n pieces and send the n pieces of data to the trusted computing node. In this way, each TA may obtain one data fragment of the user equipment, and does not know complete data of the user equipment, thereby protecting data security of the user equipment.

In a possible design, computing logic of the n TAs is the same. To be specific, when determining to perform a computation task, the trusted computing node may copy the computation task to obtain n computation tasks, where each computation task is equivalent to one TA. In this way, a plurality of TAs can be quickly obtained, and implementation is simple. Certainly, the n TAs may not be exactly the same.

In a possible design, that the trusted computing node controls each TA to perform computation based on the data fragment set of each TA includes: The trusted computing node controls each TA to perform computation on the data fragment set of each TA, and controls each TA to output an intermediate computation result of each TA to a trusted operator for continuing computation; and the trusted computing node controls the trusted operator to output an intermediate computation result of the trusted operator to each TA for continuing computation, to obtain the computation result of each TA. The trusted operator here is equivalent to an assistant computation tool, and may assist the plurality of TAs in completing computation tasks. The trusted operator may be implemented by software, or may be implemented by hardware. The trusted operator may be understood as a basic general operator, and these basic general operators may be considered as collaborative computing modules that provides assistant computation and optimizes the plurality of TAs, to avoid any trust on an assistant computation party. For example, when the trusted operator is implemented by hardware, a dedicated chip may be used for implementing a function of the trusted operator.

In a possible design, the controlling each TA to output an intermediate computation result of each TA to a trusted operator for continuing computation includes: The trusted computing node controls each TA to encrypt the computation result of each TA to obtain the intermediate computation result of each TA, controls each TA to output the intermediate computation result of each TA to the trusted operator, and controls the trusted operator to decrypt the intermediate computation result of each TA, to control the trusted operator to continue computation based on a decrypted computation result; and that the trusted computing node controls the trusted operator to output an intermediate computation result of the trusted operator to each TA for continuing computation, to obtain the computation result of each TA includes: The trusted computing node controls the trusted operator to encrypt a computation result of the trusted operator to obtain the intermediate computation result of the trusted operator, outputs the intermediate computation result of the trusted operator to each TA, and controls each TA to decrypt the intermediate computation result of the trusted operator, to control each TA to continue computation based on a decrypted computation result, so as to obtain the computation result of each TA.

In other words, when the trusted operator communicates with the n TAs, input and output of the trusted operator and the TAs need to be encrypted. The encryption may be implemented by simple transmission encryption. In other words, the trusted operator and the TAs need to be decrypted before computation. The computation is performed in plain text, so that efficiency is high. Cryptographic algorithms are not restricted during transmission. For example, in this application, an efficient symmetric encryption algorithm such as AES may be used, without affecting efficiency of the solution.

In a possible design, each user equipment is configured to perform algorithm integrity verification on the n TAs. To be specific, when the trusted computing node determines the n TAs, the user equipment needs to perform remote attestation on the n TAs to determine reliability of the n TAs, so as to ensure data security.

In a possible design, before the trusted computing node receives data sent by each of the m user equipments, the method further includes: The trusted computing node receives remote attestation requests respectively sent by the m user equipments, where the remote attestation requests are used for requesting verification on the n TAs; and the trusted computing node sends, to each of the m user equipments, measurement results respectively corresponding to the n TAs, where the measurement result corresponding to each of the n TAs includes a node parameter of hardware and a hash value of a software program that correspond to each TA, the measurement results respectively corresponding to the n TAs are used by each user equipment to verify whether the n TAs are tampered with, and the user equipment sends the n data fragments to the trusted computing node when the verification succeeds. It may be understood that remote attestation performed by the user equipment on a plurality of TAs is similar to remote attestation performed on one single TA, provided that measurement results corresponding to the plurality of TAs are correct, to ensure security of data computation after the user equipment sends data.

According to a second aspect, a trusted computing node is provided, including: a processing unit, configured to determine n trusted applications TAs for a same computation task of m user equipments, where m is an integer greater than or equal to 1, and n is an integer greater than 1; and a transceiver unit, configured to receive data sent by each of the m user equipments, where the data sent by each user equipment is used for performing the same computation task. The processing unit is further configured to determine a data fragment set of each TA of the n TAs participating in the computation, where the data fragment set of each TA includes one data fragment in the data sent by each user equipment; and the processing unit is further configured to control each TA to perform computation based on the data fragment set of each TA, and determine a computation result of the same computation task based on a computation result of each TA.

For beneficial effects of the second aspect, refer to the descriptions of the first aspect.

In a possible design, the data sent by each user equipment includes n data fragments, and the data fragment set of each TA includes one of the n data fragments sent by each user equipment.

In a possible design, computing logic of the n TAs is the same.

In a possible design, the processing unit is configured to: control each TA to perform computation on the data fragment set of each TA, control each TA to output an intermediate computation result of each TA to a trusted operator for continuing computation, and control the trusted operator to output an intermediate computation result of the trusted operator to each TA for continuing computation, to obtain the computation result of each TA.

In a possible design, the processing unit is configured to: control each TA to encrypt the computation result of each TA to obtain the intermediate computation result of each TA, control each TA to output the intermediate computation result of each TA to the trusted operator, and control the trusted operator to decrypt the intermediate computation result of each TA, to control the trusted operator to continue computation based on a decrypted computation result. The controlling the trusted operator to output an intermediate computation result of the trusted operator to each TA for continuing computation, to obtain the computation result of each TA includes: controlling the trusted operator to encrypt a computation result of the trusted operator to obtain the intermediate computation result of the trusted operator, outputting the intermediate computation result of the trusted operator to each TA, and controlling each TA to decrypt the intermediate computation result of the trusted operator, to control each TA to continue computation based on a decrypted computation result, so as to obtain the computation result of each TA.

In a possible design, each user equipment is configured to perform algorithm integrity verification on the n TAs.

In a possible design, the transceiver unit is further configured to: receive remote attestation requests respectively sent by the m user equipments, where the remote attestation requests are used for requesting verification on the n TAs; and send, to each of the m user equipments, measurement results respectively corresponding to the n TAs, where a measurement result corresponding to each of the n TAs includes a node parameter of hardware and a hash value of a software program that correspond to each TA, the measurement results respectively corresponding to the n TAs are used by each user equipment to verify whether the n TAs are tampered with, and the user equipment sends the n data fragments to the trusted computing node when the verification succeeds.

According to a third aspect, a trusted computing system is provided. The trusted computing system includes a trusted component, an untrusted component, and a secure extension component. The untrusted component includes a non-secure application, an application programming interface API in a non-secure trusted execution environment TEE, and an untrusted operating system OS. The trusted component includes n secure applications, an API in a secure TEE, and a trusted OS. The secure application is configured to call the API in the secure TEE corresponding to the trusted OS, so that the trusted OS executes a command of the secure application. The trusted OS is configured to: determine n trusted applications TAs for a same computation task of m users, where m is an integer greater than or equal to 1, and n is an integer greater than 1; receive data sent by each of the m user equipments, where the data sent by each user equipment is used for performing the same computation task; determine a data fragment set of each TA of the n TAs participating in the computation, where the data fragment set of each TA includes one data fragment in the data sent by each user equipment; control each TA to perform computation based on the data fragment set of each TA, and determine a computation result of the same computation task based on a computation result of each TA; and control each TA to perform computation based on the data fragment set of each TA, and determine a computation result of the same computation task based on a computation result of each TA.

For beneficial effects of the third aspect, refer to the descriptions of the first aspect.

In a possible design, the data sent by each user equipment includes n data fragments, and the data fragment set of each TA includes one of the n data fragments sent by each user equipment.

In a possible design, computing logic of the n TAs is the same.

In a possible design, the trusted OS is specifically configured to: control each TA to perform computation on the data fragment set of each TA, control each TA to output an intermediate computation result of each TA to a trusted operator for continuing computation, and control the trusted operator to output an intermediate computation result of the trusted operator to each TA for continuing computation, to obtain the computation result of each TA.

In a possible design, the trusted OS is specifically configured to: control each TA to encrypt the computation result of each TA to obtain the intermediate computation result of each TA, control each TA to output the intermediate computation result of each TA to the trusted operator, and control the trusted operator to decrypt the intermediate computation result of each TA, to control the trusted operator to continue computation based on a decrypted computation result. The controlling the trusted operator to output an intermediate computation result of the trusted operator to each TA for continuing computation, to obtain the computation result of each TA includes: controlling the trusted operator to encrypt a computation result of the trusted operator to obtain the intermediate computation result of the trusted operator, outputting the intermediate computation result of the trusted operator to each TA, and controlling each TA to decrypt the intermediate computation result of the trusted operator, to control each TA to continue computation based on a decrypted computation result, so as to obtain the computation result of each TA.

In a possible design, each user equipment is configured to perform algorithm integrity verification on the n TAs.

In a possible design, the trusted OS is further configured to receive remote attestation requests respectively sent by the m user equipments, where the remote attestation requests are used for requesting verification on the n TAs, and send, to each of the m user equipments, measurement results respectively corresponding to the n TAs, where a measurement result corresponding to each of the n TAs includes a node parameter of hardware and a hash value of a software program that correspond to each TA, the measurement results respectively corresponding to the n TAs are used by each user equipment to verify whether the n TAs are tampered with, and the user equipment sends the n data fragments to the trusted computing node when the verification succeeds.

According to a fourth aspect, a communication system is provided, including the trusted computing node according to any one of the second aspect or the possible designs of the second aspect, or the trusted computing node according to any one of the third aspect or the possible designs of the third aspect, and at least one user equipment that communicates with the trusted computing node.

According to a fifth aspect, a communication apparatus is provided, including at least one processor. The at least one processor is connected to a memory, and the at least one processor is configured to read and execute a program stored in the memory, so that the apparatus performs the method according to any one of the first aspect or the possible designs of the first aspect.

According to a sixth aspect, a chip is provided. The chip is coupled to a memory, and is configured to read and execute program instructions stored in the memory, to implement the method according to any one of the first aspect or the possible designs of the first aspect.

According to a seventh aspect, a trusted computing node is provided. The trusted computing node includes a transceiver, a memory, and a processor. The memory is coupled to the processor. The memory is configured to store computer program code. The computer program code includes computer instructions. The transceiver is configured to receive data and send data. When the processor executes the computer instructions, the trusted computing node performs the data security processing method according to any one of the first aspect or the corresponding possible designs of the first aspect.

According to an eighth aspect, this application provides a chip system. The chip system is used in a trusted computing node. The chip system includes one or more interface circuits and one or more processors. The interface circuit and the processor are interconnected by a line. The interface circuit is configured to receive a signal from a memory of the trusted computing node, and send the signal to the processor. The signal includes computer instructions stored in the memory. When the processor executes the computer instructions, the trusted computing node performs the data security processing method according to the first aspect or the corresponding possible designs of the first aspect.

According to a ninth aspect, a computer program product is provided. When the computer program product runs on a computer or a processor, the computer or the processor is enabled to perform the method according to any one of the first aspect or the possible designs of the first aspect.

According to a tenth aspect, a computer-readable storage medium is provided, including computer instructions. When the computer instructions are run on an electronic device, the electronic device is enabled to perform the method according to any one of the first aspect or the possible designs of the first aspect.

BRIEF DESCRIPTION OF DRAWINGS

FIG. 6 is a schematic diagram of a network architecture according to an embodiment of this application;

FIG. 7 is a schematic flowchart of a data security processing method according to an embodiment of this application;

DESCRIPTION OF EMBODIMENTS

For ease of understanding, some concepts related to embodiments of this application are described for reference by using examples. Details are shown as follows:

Trusted execution environment (Trusted Execution Environment, TEE): is a secure area in a central processing unit (Central Processing Unit, CPU). The TEE runs in an independent environment and runs in parallel with an operating system. The CPU can ensure that confidentiality and integrity of code and data in the TEE are protected. The CPU uses both hardware and software to protect the data and code, making the TEE more secure than the operating system. Trusted applications running in the TEE can access all functions of a main processor and a memory of a device, and hardware isolation protects components of these trusted applications from being affected by user-installed applications running in the main operating system.

Intel software guard extensions (Software Guard Extensions, SGX): is a typical TEE solution, that is, a product for implementing the TEE. The SGX can protect selected code and data from being revealed and modified. Developers may distribute an application into a CPU-enhanced enclave (secure area) or an executable protected area in the memory, to improve security even on an attacked platform. By using this new application layer TEE, the developers can enable identity and record privacy, secure browsing, and digital rights management (Digital Rights Management, DRM) functions, or this new application layer TEE can be used in any high-security application scenario with a need to securely store secret or protect data.

Enclave: is a main means for isolating and protecting data in a TEE. The enclave is for encapsulating a security operation of legitimate software into the enclave to protect the software from a malware attack. Neither privileged software nor non-privileged software can access the enclave. In other words, once software code and data are located in the enclave, even an operating system or a virtual machine monitor (Virtual Machine Monitor, VMM) cannot affect the code and data in the enclave.

Secure multi-party computation (Secure Multi-party Computation, SMC): as a sub-field of cryptography, allows a plurality of data owners to perform collaborative computing without mutual trust and output computation results, and ensures that no party can obtain any information other than a computation result to which the party is entitled.

A core technology of trusted computing is data isolation, that is, protecting user data from being accessed by another entity, such as an administrator or another superuser. Although existing full-ciphertext computation can also protect data privacy through full-process and full-environment encryption, implementation costs are too high. Therefore, the data isolation is still a more extensively used and practical data protection method.

Figure 1:
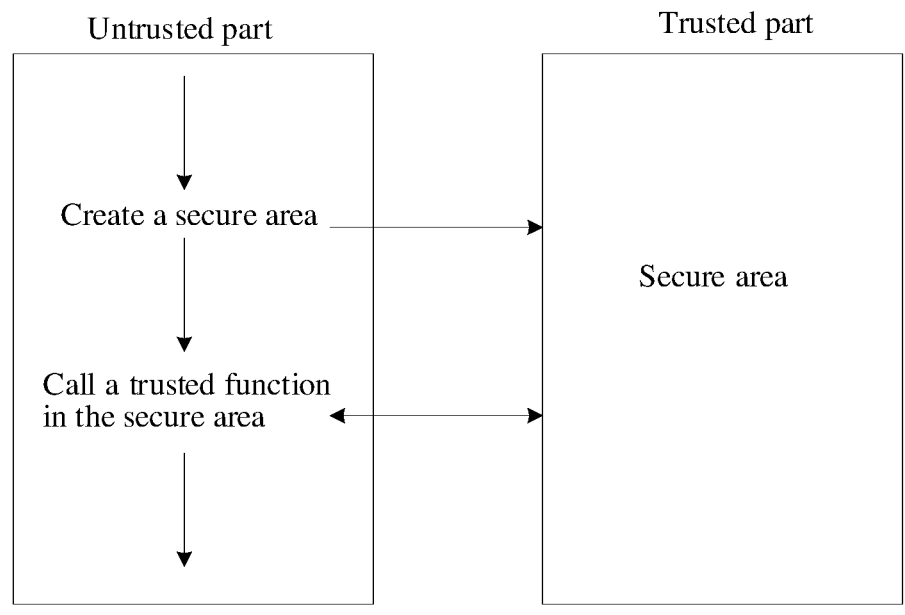
FIG. 1 is a schematic diagram of an architecture of an SGX technology according to an embodiment of this application.

As a trusted computing technology, the TEE can define an independent trusted zone in a CPU and a memory, and implement isolation of running environments of different TAs in the CPU and the memory, to prevent different TAs from accessing data of each other. Even a TA with a relatively high weight level cannot access data across boundaries. At present, representative technologies in the IT industry are SGX, secure encrypted virtualization (Secure Encrypted Virtualization, SEV) of Advanced Micro Devices (Advanced Micro Devices, AMD), and trust zone (Trust zone) under an architecture of Advanced RISC Machine (Advanced RISC Machine, ARM). For example, as shown in FIG. 1, the SGX technology may divide an application into two parts: a trusted (trusted) part and an untrusted (untrusted) part. The trusted part refers to a secure area. Code in the trusted part is code for accessing application secret (secret). The application may have at least one secure area. The untrusted part includes the remaining part of the application and all modules of the remaining part. In terms of the secure area, both the operating system and a virtual machine monitor are considered as untrusted parts. When the application (Application, APP) runs and creates a secure area (creates an enclave), the enclave is placed in a trusted memory of the trusted part, and a trusted function in the secure area is called. For code run in the enclave, used data can be viewed. Once the data is out of the enclave, the data needs to be encrypted, and any access to data in the enclave from the outside of the enclave is to be denied. In other words, the TEE further encrypts the data in the enclave while isolating data of different TAs in partitions in the enclave. Users store their own privacy data in a TEE address, so that the data is protected by the TEE. Computation in such isolated environment, the TEE, becomes confidential computation.

Figure 2:
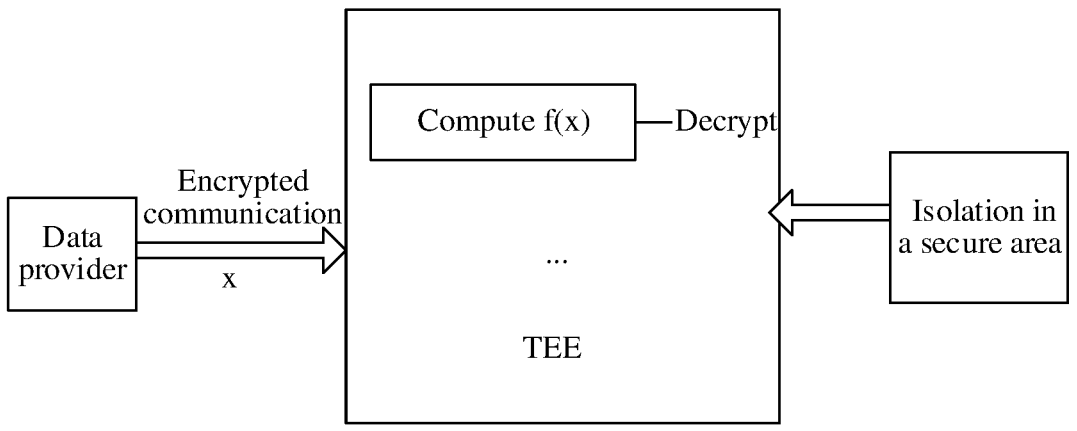
FIG. 2 is a schematic diagram of a scenario of encrypted communication between a data provider and a TEE according to an embodiment of this application.

For example, as shown in FIG. 2, when a user, as a data provider, submits private data x (plaintext) to the TEE via encrypted communication, and the TEE uses a TA to implement confidential computation f(x), ciphertext of the data x is stored in the secure area enclave for isolation. When the TEE needs to compute f(x), the TEE obtains the ciphertext from the enclave and performs computation after decryption.

Figure 3:
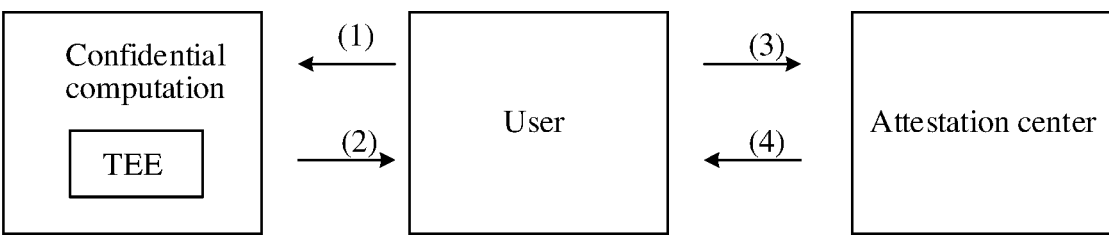
FIG. 3 is a schematic diagram of a process of a remote attestation process according to an embodiment of this application.

In addition, the TEE also has a security feature, that is, remote attestation (remote attestation). The remote attestation is for users to verify software and hardware configurations of the TEE, including verification of a hardware environment based on a trusted root of a CPU chip and a TA program running in the TEE, to ensure that the software and hardware configurations of the TEE are selected by users and not tampered with. In this way, integrity protection can be provided for the confidential computation. For example, a working process of the remote attestation is shown in FIG. 3. The process includes: (1) A user, as a data provider, submits a remote attestation request to a TEE. (2) The TEE measures a running environment and feeds a measurement result back to the user. The measurement result includes an environment parameter of hardware and a hash (hash) value of a software program of the TEE. The measurement result is signed by a built-in private key (unique to each chip) of the CPU chip in the TEE. (3) After verifying the measurement result of the TEE, the user obtains a public key corresponding to a private key of the CPU chip from an attestation center (attestation center) of the CPU chip. (4) The user verifies a signature result of the measurement result of the TEE based on the public key obtained from the attestation center, to determine whether the verification succeeds. If the verification succeeds, it indicates that the software and hardware configurations of the TEE are selected by the user and are not tampered with.

The SGX is a typical product for implementing the TEE. The SGX relates to new extensions of an original TEE architecture, that is, adding a group of new instruction sets and a memory access mechanism to the original TEE architecture. These extensions allow the application to implement a container of the enclave. To be specific, protected space is defined in address space of the application, to protect confidentiality and integrity of the code and data in the enclave from damage by malware with a special permission.

Figure 4:
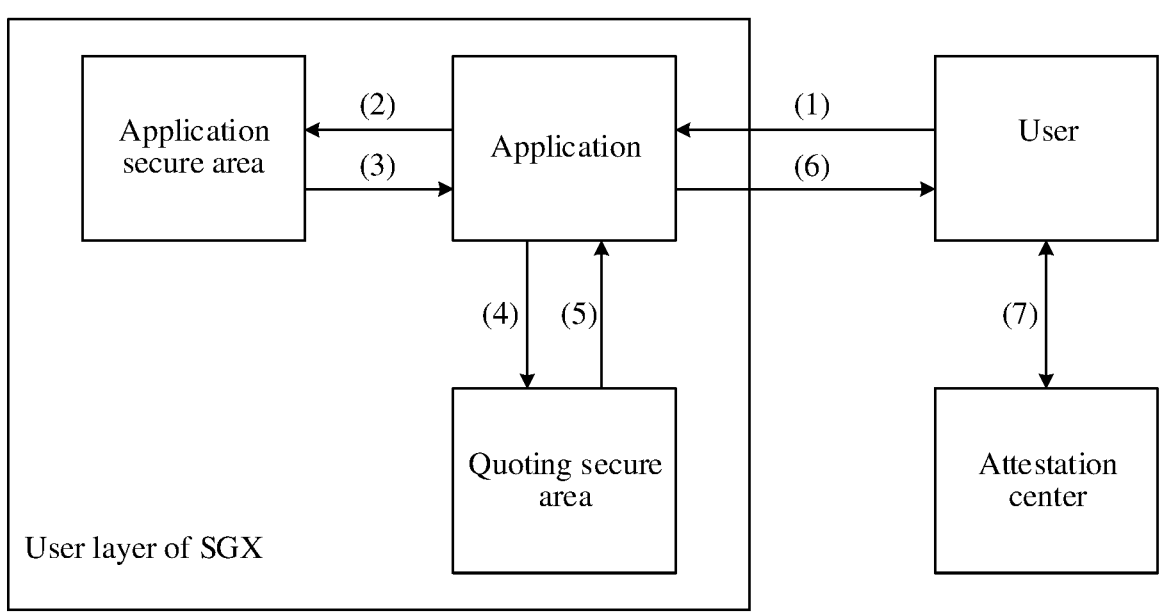
FIG. 4 is a schematic diagram of a process of a remote attestation process according to an embodiment of this application.

Certainly, as the product of the TEE, the SGX also needs to provide remote attestation, and a basic process of the remote attestation is similar to the process in FIG. 3. In addition to a measured user TA and the enclave, a quoting secure area (quoting enclave) of the SGX is further needed in measuring a hardware parameter. The quoting enclave can be understood as a special enclave program, which can securely perform logical computation of a digital signature for remote attestation (remote attestation). As shown in FIG. 4, a remote attestation process at a user layer of the SGX may include: (1) A user (also referred to as a challenger) sends a remote attestation request to an application (application) in the SGX. (2) The application sends a TEE code measurement request to an application secure area (application enclave) that stores user data. (3) The application enclave returns a TEE code measurement result to the application. (4) The application sends a TEE hardware measurement request to the quoting enclave. (5) The quoting enclave returns a TEE hardware measurement result to the application. (6) The application returns the TEE code measurement result and TEE hardware measurement result to the user. (7) The user obtains a key from an attestation center to verify the TEE code measurement result and the TEE hardware measurement result.

It can be learned from the foregoing descriptions that emergence of the TEE (or the SGX used as a product of the TEE) implements secure computation outsourcing, so that a user without local computing power can provide privacy data of the user to a TEE of a computing power provider, and computation is performed by a user TA in the TEE, to protect data privacy of the user. However, this is suitable for a one-to-one scenario, that is, a scenario in which one user uses computing power of one computing power provider, in other words, one computation task involves data of one user. In this case, the TEE needs to establish only one TA for the computation task. However, the TEE can implement only data isolation between different TAs. If one computation task involves privacy data of a plurality of users, the TA established by the TEE involves the privacy data of the plurality of users, and therefore data isolation between different users cannot be implemented. Even if the privacy data of the plurality of users is entrusted to a trusted third party, and confidential computation is performed in the TEE by a TA of the third party, a security premise of the confidential computation, that is, relying only on trust in hardware of the TEE, without a need of additional trust assumption, namely, a need to trust the third party, is damaged. If the third party leaks data, user data cannot be protected.

Therefore, when data privacy that needs to be protected involves a plurality of data providers, distrust or even a competition relationship between the plurality of data providers usually leads to a mandatory data privacy protection requirement. As mentioned above, TEE-based confidential computation is not applicable in such scenario. In this case, solutions mostly rely on a protocol referred to as secure multi-party computation (Secure Multi-party Computation, SMC). The secure multi-party computation is essentially a cryptography-based secure computation method.

In the secure multi-party computation, a group of data providers is considered as computation participants, to resolve a privacy protection problem during collaborative computing by a group of computation participants that do not trust each other. The secure multi-party computation needs to ensure features such as independence of inputs, correctness of computations, and decentralization, and avoid leaking input values to other members participating in the computation. The secure multi-party computation is mainly aimed to resolve a problem of how to securely compute a specified function without a trusted third party. In addition, it is required that each computation participant can obtain no input information of another entity other than a computation result. At present, there are mainly two security models for the secure multi-party computation: an honest-but-curious adversary model (Honest-but-curious adversary model) and a malicious adversary model (Malicious adversary model). However, with respect to the two models, in the honest-but-curious adversary model, computation participants may attempt to obtain information that does not belong to them although all computation participants strictly execute the computation protocol and there is no tampering; and in the malicious adversary model, any computation participant may use any method to achieve any purpose, including tampering and deviation from the computing protocol.

Therefore, the secure multi-party computation requires computation participants to respectively hold private data and compute functions of the data without leaking the data. Therefore, distributed computing is usually used in the secure multi-party computation. A node of each computation participant completes data extraction and computing locally on the node based on computing logic, and routes an obtained intermediate computation result to a specified node, and the specified node then routes the intermediate computation result to a node of another computation participant, so that a collaborative computing task is completed by multi-party nodes, to output a unique computation result. In the entire process, computation on data of each computation participant is performed locally, and no original data is provided to the node of another computation participant. In this way, each computation participant only needs to feed the intermediate computation result back to an entire computation task system, so that each computation participant obtains a correct final computation result, while ensuring data privacy. Currently, a universal secure multi-party computation framework enables each computation participant to securely compute a result of any function or a specific type of function.

Figure 5:
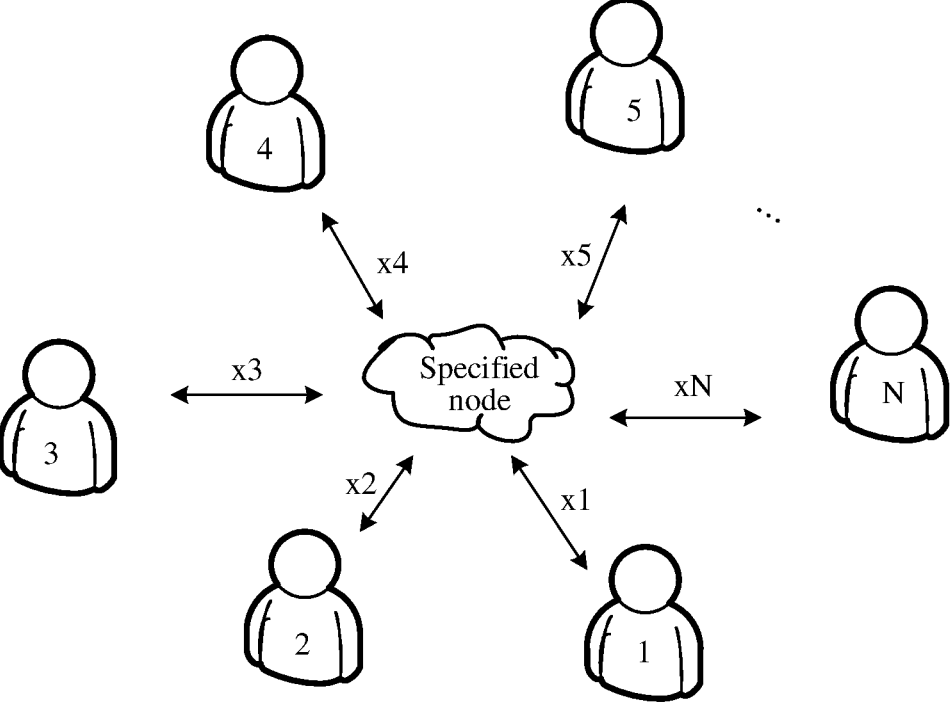
FIG. 5 is a schematic diagram of a scenario of a secure multi-party computation task according to an embodiment of this application.

For example, in a secure multi-party computation task, as shown in FIG. 5, there are N data providers (1, 2, 3, 4, 5, . . . , and N), and the N data providers participate in computation as computation participants. Assuming that local data of each computation participant is x, intermediate computation results of computation performed on x by the computation participants are x1, x2, x3, x4, x5, . . . , and xN. Each computation participant may send its own intermediate computation result to a specified node. The specified node sends the received intermediate computation result to another computation participant for computation. The specified node is used only for intermediate data transmission. A computation process is performed by each computation participant. The final computation result obtained by each computation participant is the same.

However, in secure multi-party computation, a computing protocol needs to be designed and optimized individually for each case of multi-party secure computation, and there is no universal solution. For example, for a security computation task, to distribute the computation task to each computation participant, a computation task of each computation participant needs to be determined on the spot based on the security computation task, resulting in low computing efficiency. Further, in the secure multi-party computation, a large amount of intermediate data is to be exchanged between computation participants, especially when the computation participants rely on network communication for distributed computing, and therefore communication costs are high. In addition, to improve the computing efficiency, in the secure multi-party computation, a third-party is usually employed to assist in computation. This causes a third-party trust problem. Although the third party assisting in computation usually does not obtain privacy data and does not require absolute trust, the third party and some computation participants may collude with each other to steal data of other participants. Moreover, when a strong security model is used, in the secure multi-party computation, correctness of all computation, that is, integrity of a computation protocol program, needs to be proved. An existing proof method is mainly cryptography-based zero-knowledge proof, of which a proof process is complex and costly.

In conclusion, currently, for a same computation task, during processing multi-party user data in security computation, TEE-based confidential computation cannot implement data isolation between users when the multi-party user data is processed in a same TA. Even if the third party is entrusted to perform computation on the multi-party user data, the possibility of data leakage by the third party still exists because the third party has privacy data of all users. For example, the data may be tampered with, rendering damage to computation correctness.

Cryptography-based secure multi-party computation is not universally applicable and has low computing efficiency. Even if a third-party is employed for computation, there is still a problem on trust in the third-party.

Therefore, this application provides a data security processing method. The method is applicable to a TEE, and the TEE is applied to a multi-party computation scenario, to implement efficient and secure computation by a plurality of data providers involved in a same computation task. In this method, a plurality of TAs run in one TEE, each TA serves as a computation participant, and each TA is configured to perform computation based on data fragments by the plurality of data providers. In this way, although these TAs collaboratively perform computation on data of the plurality of data providers, data isolation of a plurality of users can be implemented, and leakage of data of the data providers is avoided. The method can implement TEE-based secure multi-party computation, and is high in computing efficiency and applicability.

The data security processing method in this application is applicable to a network architecture shown in FIG. 6. The network architecture includes at least one data provider, a trusted computing node that has a TEE, and an attestation center.

Data of the at least one data provider is used for performing a same computation task, and for data of each data provider, a quantity of fragments into which the data is split can be determined based on a quantity of sub-tasks arranged in the TEE for the same computation task. Each sub-task corresponds to one TA (for example, TA_1, TA_2, . . . , and TA_n in FIG. 6). In other words, a quantity of TAs is the same as the quantity of fragments into which the data of each data provider is split. For example, for one of the data providers, data of the data provider is split into n data fragments, and one of the n data fragments is sent to each TA. For each TA, each TA receives a data fragment sent by each of the at least one data provider. Assuming that a quantity of the at least one data provider is m (for example, data provider 1, data provider 2, . . . , and data provider m in FIG. 6), each TA receives m data fragments from different data providers. M is an integer greater than or equal to 1, and n is an integer greater than or equal to 2.

After each TA in a trusted computing node having a TEE receives the data fragment of the at least one data provider, each TA performs the sub-task based on the received m data fragments, to obtain a final computation result. The trusted computing node may be, for example, a cloud server or another third-party computing node.

The attestation center may be used, before the plurality of TAs perform sub-tasks, by the at least one data provider to communicate with the TEE and the attestation center to determine whether verification on the plurality of TAs succeeds. In other words, the at least one data provider performs remote attestation on the plurality of TAs. The at least one data provider sends the data fragments to the plurality of TAs in the TEE only when it is determined that the verification on the plurality of TAs succeeds.

In this application, measurement and proof on each TA not only may be verified by a data owner, that is, the at least one data provider, but may be verified by another data provider, another computation participant, or even any independent bystander, to ensure correctness and integrity of computation.

The network architecture in this application may be used in a plurality of data processing scenarios. For example, there are two user equipments: a front end face sampling device and a back end face repository device. The front end face sampling device splits collected front end face data and sends the split data to a cloud server having a TEE. The back end face repository device splits preset back end face data and sends the split data to the cloud server having a TEE. The cloud server may perform data comparison computation based on the front end face data and the back end face data, to determine whether the front end face sampling data exists in a back end face repository.

By using the network architecture provided in this application, the following describes the data security processing method in this application.

As shown in FIG. 7, this application provides a data security processing method. The method includes the following steps.

701. A trusted computing node determines n TAs for a same computation task of m user equipments, where m is an integer greater than or equal to 1, and n is an integer greater than 1.

The trusted computing node in this application includes a TEE. The m user equipments may be understood as m data providers.

When the TEE receives computing requests of the m users, the TEE may first determine a computation task for the computing requests of the m users, and the computation task may be understood as a general computation task. Then, the TEE may determine n sub-tasks for the computation task. Each sub-task corresponds to one TA. In other words, the n sub-tasks correspond to n TAs: TA_1, TA_2, . . . , TA_n.

For example, a computation function of the computation task is F( ), a sub-function corresponding to TA_1 is F1, a sub-function corresponding to TA_2 is F2, and a sub-function corresponding to TA_n is Fn.

In some embodiments, the trusted computing node determines that each of the n sub-tasks is identical to the same computation task. In other words, a sub-function corresponding to each sub-task directly inherits the computation function corresponding to the general computation task. Based on the foregoing example, $F( )=F1=F2= \ldots =Fn$.

In some embodiments, the trusted computing node determines the n sub-tasks of the computation task based on a preset framework of the computation function and the sub-functions. In this case, each sub-task is different from the computation task, and n sub-functions are not obtained by simply copying the computation function.

In addition, in some embodiments, the trusted computing node determines that a quantity of the n sub-tasks is the same as a quantity of the m user equipments, and each user equipment is configured to control data security of one of the n sub-tasks. In other words, m=n. This situation may be understood as follows: The m user equipments are m data providers, the m data providers also serve as m computation participants, and each computation participant controls one TA to participate in multi-party computation. In this way, no trust assumption is needed. Without approval and configuration of a corresponding data provider, no user can obtain data of the data provider.

702. The trusted computing node receives data sent by each of the m user equipments, where the data sent by each user equipment is used for performing the same computation task.

For example, for one of the m user equipments, when the user equipment determines that a quantity of the sub-tasks (TAs) in the trusted computing node is n, the user equipment may split to-be-sent data x1 into n pieces, to obtain n data fragments. Then, the user equipment sends the n data fragments to the trusted computing node.

703. The trusted computing node determines a data fragment set of each TA of the n TAs participating in the computation, where the data fragment set of each TA includes one data fragment in the data sent by each user equipment.

The trusted computing node may allocate the n data fragments to the n sub-tasks for execution, that is, allocate the n data fragments to the n TAs for running. Each TA obtains one of the n data fragments.

In this way, if the data of the m user equipments is split into n pieces separately and the split data is allocated to the n TAs, each TA needs to process m data fragments, and the m data fragments processed by each TA are respectively from the m user equipments, or in other words, from m data providers. The data fragment set of each TA includes m data fragments from the m data providers.

It should be noted that, simply, n data fragments are obtained for each user equipment after each user equipment splits the to-be-sent data into n data fragments. After receiving n data fragments of a specific user equipment, the trusted computing node may allocate the n data fragments to n TAs, respectively. Each TA obtains one data fragment of the user equipment. Even if a user equipment splits data into n or more data fragments, and the trusted computing node determines that two or more data fragments of the user equipment are allocated to a TA, it may also be understood that part of data of the user equipment is allocated to the TA. In this case, it may still be considered that one data fragment of the user equipment is allocated to the TA, and the TA still processes one data fragment of the user, so that a situation in which a plurality of data fragments of a user equipment are allocated to one TA will not occur. In this case, it may still be considered that the user equipment splits the data into n data fragments.

704. The trusted computing node controls each TA to perform computation based on the data fragment set of each TA, and determines a computation result of the same computation task based on a computation result of each TA.

When the n TAs perform computation based on received data fragment sets, a final computation result of the general computation task may be obtained.

It should be understood that before step 702, that is, before the m user equipments send the data to the trusted computing node, the m user equipments further need to communicate with the trusted computing node and an attestation center, to determine whether the n TAs in the trusted computing node are reliable, and send data fragments to the trusted computing node only when determining that the n TAs are reliable. Specific implementation is further described below.

Therefore, in the data security processing method provided in this application, if all data sent by the m user equipments is used for performing a same computation task, the trusted computing node may establish a plurality of sub-tasks for the m user equipments, and each sub-task runs one TA. In other words, n TAs are established. Each of the m user equipments may split to-be-sent data into n data fragments, and each TA obtains one of the n data fragments. In other words, for each TA in this application, computation on the data of the m user equipments is not performed in one TA, and each TA obtains only one data fragment in the data of each user equipment, and does not obtain complete data of any one of the user equipments. In this way, an objective of data isolation between a plurality of users is well achieved, and data leakage is less likely to occur. In addition, computation on the data of all user equipments is performed in a trusted computing node having a TEE, without involving assistance of a third-party node in the computation. Therefore, computing efficiency is high.

In addition, in comparison with a secure multi-party computation solution, in this application, cross-network communication interaction originally performed between a plurality of computing nodes in secure multi-party computation is performed between TAs of a same trusted computing node, without a need for communication between the plurality of computing nodes, thereby increasing a computing speed. In addition, with no need to rely on a protocol of a specific application task of the secure multi-party computation, this application has relatively high universality.

Figure 8:
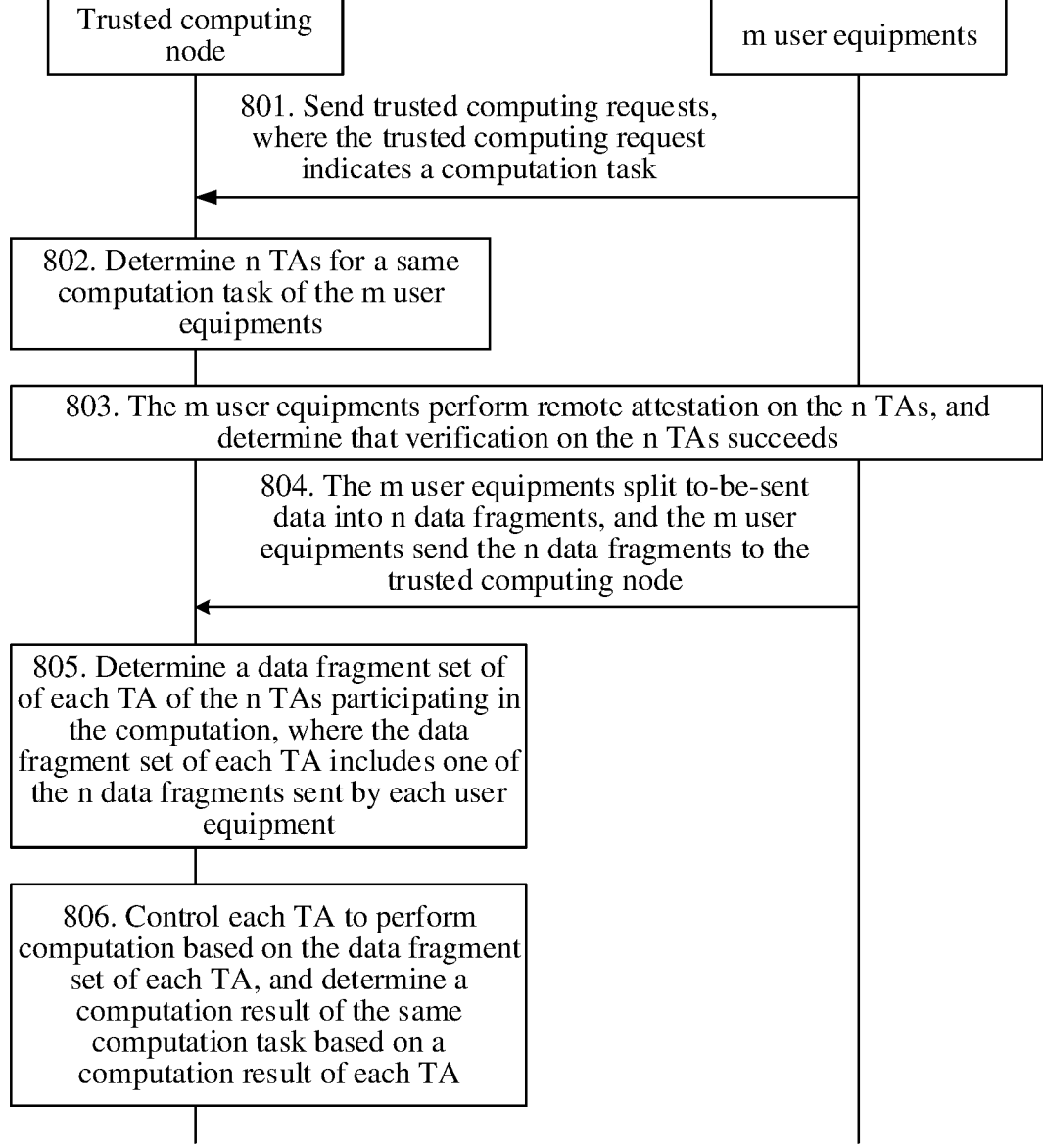
FIG. 8 is a schematic flowchart of a data security processing method according to an embodiment of this application.

The following further describes the data security processing method in this application. In the method, when at least one user equipment requests the trusted computing node for data computation, the trusted computing node first splits the computation task into a plurality of tasks, and the at least one user equipment first needs to perform remote attestation on the plurality of tasks. Only when a result of the remote attestation indicates that verification succeeds, the at least one user equipment splits the data and sends the split data to the trusted computing node, so that sub-tasks in the trusted computing node perform computation based on the allocated data fragments of each user equipment to obtain the computation result. On this basis, a process of the data security processing method in this application is shown in FIG. 8, and includes the following steps.

801. The m user equipments send trusted computing requests to the trusted computing node, where the trusted computing request indicates a computation task.

Correspondingly, the trusted computing node receives the trusted computing requests from the m user equipments.

For example, the m user equipments include the front end face sampling device and the back end face data device in the foregoing example. When sampling face data, the front end face sampling device first sends a trusted computing request to the trusted computing node. A computation task indicated by the trusted computing request is to determine whether back end data matching the collected face data exists. In this case, the front end face sampling device may simultaneously request the back end face data device to send the back end face data to the trusted computing node, or the trusted computing node requests the back end face data device to send the back end face data to the trusted computing node.

802. The trusted computing node determines the n TAs for a same computation task of the m user equipments.

When receiving the trusted computing requests, the trusted computing node may determine, based on the computation task requests, the computation task corresponding to the computation task requests, and determine n sub-tasks based on the computation task. The n sub-tasks may be determined based on preconfigured correspondences between the computation task and the sub-tasks, or may be determined by current computation based on a computation rule.

For example, it is assumed that a computation function of the computation task is F( ), and the trusted computing node splits F( ) into n sub-tasks F1( ), F2( ), . . . , and Fn( ). As shown in FIG. 6, each sub-task forms one TA, and corresponding TA_1, TA_2, . . . , and TA_n are obtained. Each TA_i performs a sub-function Fi( ) of F( ). A value of i ranges from 1 to n.

In some embodiments, the trusted computing node determines that each of the n sub-tasks is identical to the same computation task. For example, the trusted computing node duplicates code of the computation task into n−1 copies, and the original computation task and n−1 computation tasks are used as the n sub-tasks. It may also be understood that the foregoing F1( )=F2( )= . . . =Fn( )=F( ). Certainly, the n sub-tasks may alternatively be different from each other or not completely identical.

In some embodiments, the trusted computing node determines that a quantity of the n sub-tasks is the same as a quantity of the m user equipments, and each user equipment is configured to control data security of one of the n sub-tasks. In this case, m=n. Each user equipment serves as a data provider and also serves as a computation participant, and each computation participant correspondingly controls one TA to participate in multi-party computation. When any computation participant controls computation of a TA, leakage of data of the computation participant occurs only if all TAs are breached, so that data can be effectively prevented from being obtained by another computation participant or another third party. Certainly, m may alternatively be different from n.

When m=n, implementation of task splitting in this application is relatively simple, and a function F( ) in any polynomial form may be processed. For example, any computation function F( ) may be degraded to a plurality of sub-task polynomial forms by using interpolation (such as Lagrange interpolation).

803. The m user equipments perform remote attestation on the n TAs, and determine that verification on the n TAs succeeds.

After the trusted computing node splits the computation task into n sub-tasks, the trusted computing node may notify the m user equipments that the sub-tasks are determined and that the data can be sent to the trusted computing node. However, the m user equipments further need to perform a remote attestation process on the n sub-tasks, that is, perform the remote attestation on the plurality of TAs. Unlike the conventional technologies, measurement and proof are performed on each sub-task TA_1, TA_2, . . . , TA_n in this application, while measurement and proof are performed on the computation task F( ) in the conventional technologies.

In some embodiments, the trusted computing node receives remote attestation requests respectively sent by the m user equipments. The remote attestation requests are used for requesting verification on the n TAs. The trusted computing node sends, to each of the m user equipments, measurement results respectively corresponding to the n TAs, where a measurement result corresponding to each of the n TAs includes a node parameter of hardware and a hash value of a software program that correspond to each TA, the measurement results respectively corresponding to the n TAs are used by each user equipment to verify whether the n TAs are tampered with, and the user equipment sends the n data fragments to the trusted computing node when the verification succeeds.

Figure 9:
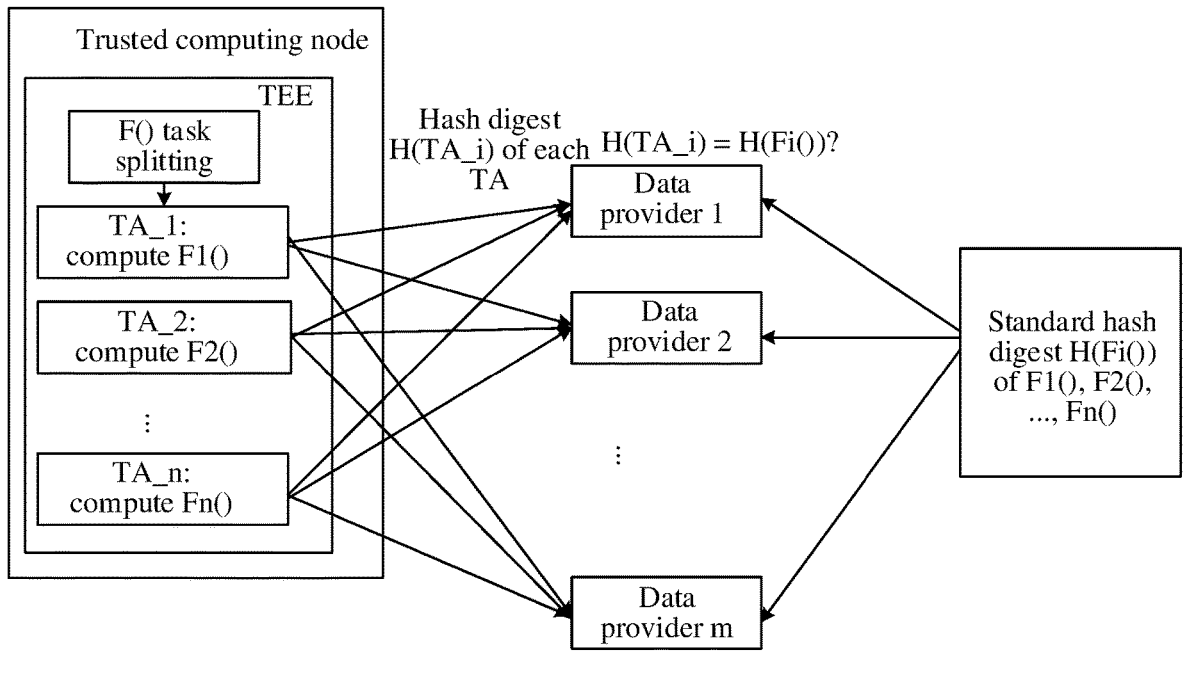
FIG. 9 is a schematic diagram of a remote attestation process on a plurality of TAs according to an embodiment of this application.

As shown in FIG. 9, the trusted computing node may include a system module for managing a task or a TA. The measurement and proof of a software program of the TA may be understood as follows: The system module has a function similar to a function of a user plane of the SGX in FIG. 4, and may generate a hash value of each TA, or generate a hash digest H(TA_i) of each TA. The measurement results respectively corresponding to the n sub-tasks may be considered as hash digests H(TA_i) of the TAs. The trusted computing node separately sends the hash digest H(TA_i) of each TA to the m data providers. For any one of the data providers, standard hash digests H(Fi( )) of F1( ) F2( ), . . . , and Fn( ) may be obtained from a public system device. Then, the data provider may compare whether the hash digest H(TA_i) received from the trusted computing node is the same as the standard hash digest H(Fi( )) received from the system device. If it is determined that the hash digest H(TA_i) is the same as the standard hash digest H(Fi( )), the data provider determines that the measurement and proof of the n sub-tasks are passed.

In some embodiments, the measurement and proof of each TA_i may be performed by the data provider, or one data provider may turn to another data provider in the m data providers or even any other independent bystander for verification.

804. The m user equipments split the to-be-sent data into n data fragments, and the m user equipments send the n data fragments to the trusted computing node.

When the m user equipments determine, through the remote attestation, that the verification on the n TAs succeeds, the m user equipments may send the data to the trusted computing node. In this case, each of the m user equipments needs to split the to-be-sent data into the n data fragments and send the n data fragments to the trusted computing node.

Data to be sent by each user equipment may be split into n data fragments according to a preset rule, or may be split into n data fragments randomly.

For example, it is assumed that data to be sent by one of the m user equipments is $S_1$, and the user equipment may split the data $S_1$ into n pieces of data: $S_{1,1}$, $S_{1,2}$, . . . , and $S_{1,n}$, where a value of l is 1 to m.

805. The trusted computing node determines a data fragment set of each TA of the n TAs participating in the computation, where the data fragment set of each TA includes one of the n data fragments sent by each user equipment.

When the trusted computing node receives n data fragments sent by any one of the m user equipments, the trusted computing node may allocate the n data fragments to the n TAs according to a specific rule. A specific allocation manner is further described below.

In this way, each TA obtains one of the n data fragments sent by each user equipment.

For example, it is assumed that, in the n data fragments separately sent by the m user equipments and received by the trusted computing node, n data fragments corresponding to the first user equipment include: $S_{1,1}$, $S_{1,2}$, . . . , and $S_{1,n}$; and the n data fragments corresponding to the second user equipment include: $S_{2,1}$, $S_{2,2}$ . . . , and $S_{2,n}$. By analogy, n data fragments corresponding to the $m^{th}$ user equipment include: $S_{m,1}$, $S_{m,2}$, . . . , and $S_{m,n}$. On this basis, the trusted computing node may allocate $S_{1,1}$, $S_{2,1}$, . . . , and $S_{m,1}$ to TA 1 for computation, allocate $S_{1,2}$, $S_{2,2}$, . . . , and $S_{m,2}$ to TA 2 for computation, and allocate $S_{1,n}$, $S_{2,n}$, . . . , and $S_{m,n}$ to TA n for computation by analogy.

806. The trusted computing node controls each TA to perform computation based on the data fragment set of each TA, and determines a computation result of the same computation task based on a computation result of each TA.

In some embodiments, when performing computation on the data fragment set, each sub-task may perform collaborative computing with basic trusted operators. These trusted operators can implement basic simple computation and communication functions, and can implement general functions of various algorithm functions. The trusted operator does not need to perform complex or high-consumption computation, and interacts with a TEE chipset and a memory, without causing excessively large communication costs.

The trusted operator may be considered as a collaborative computing module that provides assistant computation and optimizes the plurality of TAs, and the trusted operator may be implemented through software or hardware to perform a function of the trusted operator. To avoid any trust in an assistant computation party, a dedicated chip may be used for implementing the function of the trusted operator. Because computation content of the trusted operator is simple and universal, and implementation of a chip is relatively easy, if the trusted operator is packaged into a tamper-resistant (tamper-resistant) chip, the chip can prevent code tampering or information leakage, thereby avoiding an unnecessary trust assumption. Based on the hardware-based trusted operator, security can be ensured in a malicious adversary model, with cooperation of the remote attestation of the plurality of TAs in the TEE.

For example, the trusted computing node controls each sub-task to perform computation on a data fragment set of each sub-task, and controls each sub-task to output an intermediate computation result of each sub-task to the trusted operator for continuing computation. The trusted computing node controls the trusted operator to output an intermediate computation result of the trusted operator to each sub-task for continuing computation, to obtain the computation result of each sub-task. Further, the computation result of the computation task can be determined based on the computation result of each sub-task.

Figure 10:
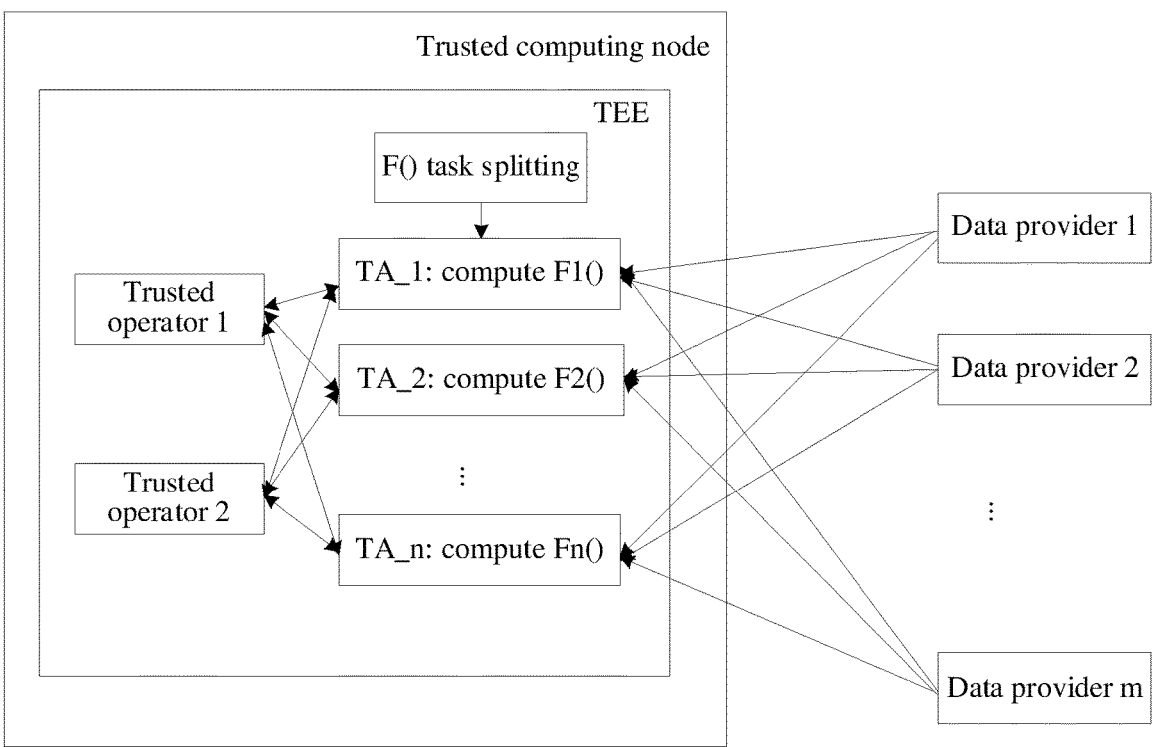
FIG. 10 is a schematic diagram of a collaborative computing process of a plurality of TAs and trusted operators according to an embodiment of this application.

As shown in FIG. 10, it is assumed that trusted operators in the trusted computing node include a trusted operator 1. After performing computation on the received data fragment sets, the n TAs may separately send a computation result 1 to the trusted operator 1 for continuing computation. When the trusted operator 1 obtains a computation result 2, the trusted operator 1 may send the computation result 2 to the n TAs for continuing computation, to obtain a computation result 3. The computation result 3 is considered as a final computation result of the computation task F( ).

It is assumed that when the trusted operator in the trusted computing node includes the trusted operator 1 and a trusted operator 2, the foregoing computation result 3 is not considered as the final computation result, and the n TAs may send the computation result 3 to the trusted operator 2 for continuing computation, to obtain a computation result 4. The trusted operator 2 then sends the computation result 4 to the n TAs for continuing computation, to obtain a computation result 5. The computation result 5 is considered as a final computation result of the computation task F( ).

In addition, the trusted computing node may further encrypt input and output of the trusted operator. In other words, when the TA obtains the computation result and attempts to send the computation result to the trusted operator, the TA needs to send, to the trusted operator, ciphertext obtained after the computation result is encrypted, and the trusted operator needs to decrypt the ciphertext and then continue computation. When the trusted operator obtains the computation result, the trusted operator also needs to encrypt the computation result and then send the encrypted computation result to the TA for continuing computation. Certainly, the TA also needs to decrypt the received ciphertext and then continue computation.

For example, the trusted computing node controls each sub-task to encrypt the computation result of each sub-task, to obtain the intermediate computation result of each sub-task, controls each sub-task to output the intermediate computation result of each sub-task to the trusted operator, and controls the trusted operator to decrypt the intermediate computation result of each sub-task, to control the trusted operator to continue computation based on a decrypted computation result.

On this basis, that the trusted computing node controls the trusted operator to output an intermediate computation result of the trusted operator to each sub-task for continuing computation, to obtain the computation result of each sub-task includes: The trusted computing node controls the trusted operator to encrypt a computation result of the trusted operator to obtain the intermediate computation result of the trusted operator, outputs the intermediate computation result of the trusted operator to each sub-task, and controls each sub-task to decrypt the intermediate computation result of the trusted operator, to control each sub-task to continue computation based on a decrypted computation result, so as to obtain the computation result of each sub-task.

In this way, for each TA in this application, computation on the data of the m user equipments is not performed in one TA, and each TA obtains only one data fragment in the data of each user equipment, but does not obtain complete data of any user equipment, so that data isolation between a plurality of users is well achieved, and data leakage is less likely to occur. Moreover, computation on the data of all user equipments is performed in one trusted computing node having a TEE, without involving third-party node-assisted computation. Therefore, computing efficiency is high.

In addition, in comparison with a secure multi-party computation solution, in this application, cross-network communication interaction originally performed between a plurality of computing nodes in secure multi-party computation is performed between TAs of a same trusted computing node, without a need for communication between the plurality of computing nodes, thereby increasing a computing speed. In addition, with no need to rely on a protocol of a specific application task of the secure multi-party computation, this application has relatively high universality.

The following describes implementations of steps 802 to 806 in this application by using examples.

In step 802, it is assumed that the trusted computing node determines that the computation function of the computation task is $F(\ )$, the split sub-functions of the n sub-tasks directly inherit $F(\ )$, that is, $F1(\ )=F2(\ )=\ldots=Fn(\ )=F(\ )$, and a polynomial obtained by degrading $F(\ )$ by using an algorithm such as interpolation is: $F(\ )=\Sigma_{j=0}^{h}a_{j}\Pi_{l=1}^{m}S_{l}^{b_{jl}}$. s represents to-be-processed data. j represents a quantity of product segments of $F(\ )$, and a value of j ranges from 0 to h, indicating that there are h+1 product segments. 1 indicates the first user equipment, a value of 1 ranges from 1 to m, and there are m user equipments in total. a and b represent constants.

In step 803, the m user equipments need to perform remote attestation on the TAs corresponding to $F1(\ )$, $F2(\ ),\ldots$, and $Fn(\ )$, that is, need to perform measurement and proof on TA_1, TA_2, ..., and TA_n, and continue to perform step 804 when the verification succeeds.

In step 804, there may be a plurality of manners for each of the m user equipments to split to-be-sent data S1. For example, data $S_1$ may be split into $S_1=S_{1,1}\times S_{1,2}\times\ldots\times S_{1,n}$ through multiplication splitting. Specifically, when 1=1, it may be understood that data to be sent by the first user equipment is $S1=S_{1,1}\times S_{1,2}\times\ldots\times S_{1,n}$; and when 1=2, it may be understood that data to be sent by the second user equipment is $S_2=S_{2,1}\times S_{2,2}\times\ldots\times S_{2,n}$. By analogy, when 1=m, the data to be sent by the $m^{th}$ user equipment is $S_m=S_{m,1}\times S_{m,2}\times\ldots\times S_{m,n}$.

Figure 11:
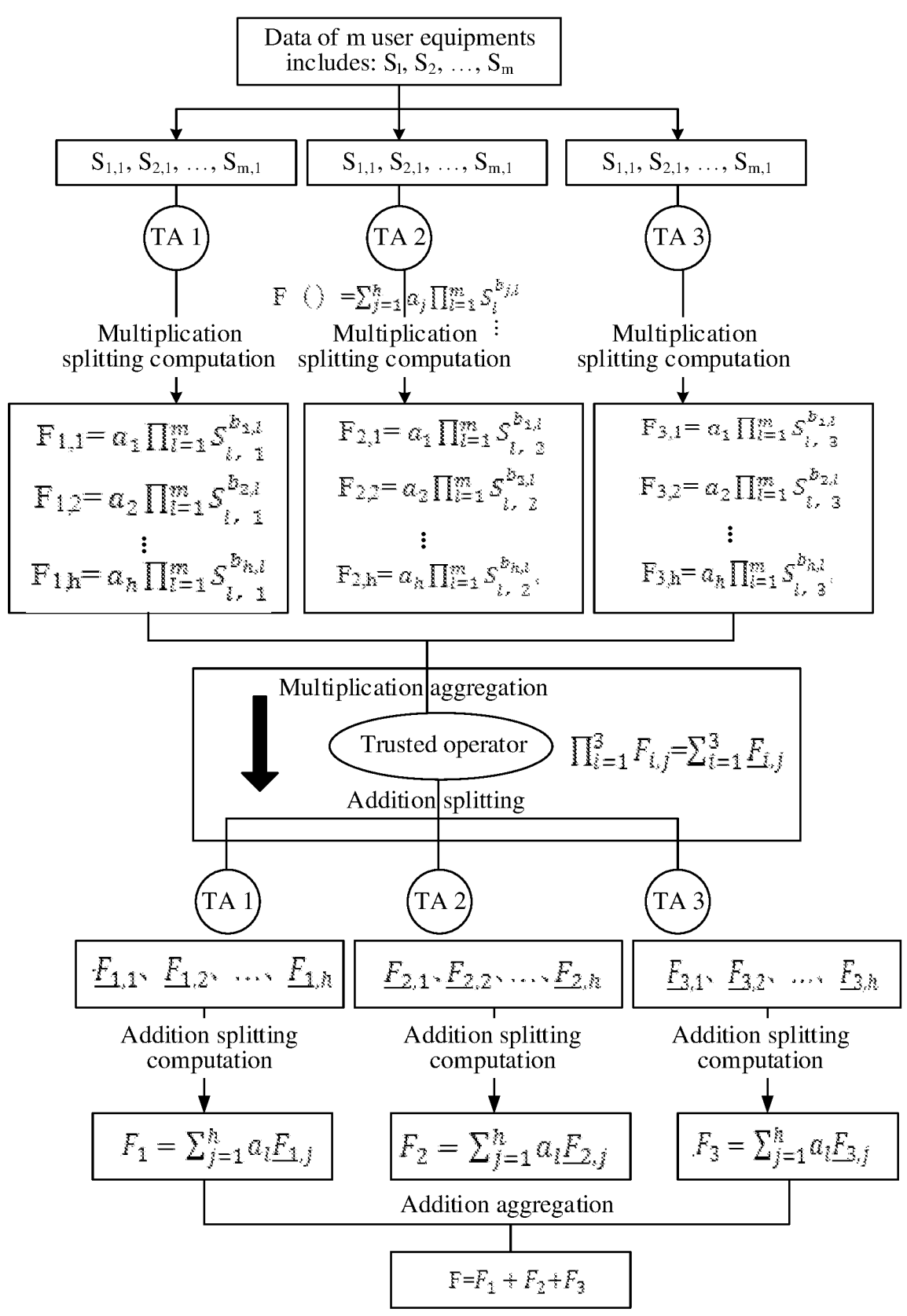
FIG. 11 is a schematic diagram of a collaborative computing process of a plurality of TAs and a trusted operator according to an embodiment of this application.

In step 805, based on the example in step 805, as shown in FIG. 11, n=3 in this application. In other words, there are three sub-tasks in total, corresponding to TA 1, TA 2, and TA 3. A data fragment set allocated to TA 1 includes: $S_{1,1}, S_{2,1},\ldots$, and $S_{m,1}$. A data fragment set allocated to TA 2 includes: $S_{1,2}, S_{2,2},\ldots$, and $S_{m,2}$. A data fragment set allocated to TA 3 includes: $S_{1,3}, S_{2,3},\ldots$, and $S_{m,3}$.

In step 806, when the trusted computing node controls each sub-task to perform computation based on the data fragment set of each sub-task, it is assumed that the trusted operator that is in the trusted computing node and that works in conjunction with the sub-task in computation includes Prd-to-Sum, to implement the collaborative computing. The Prd-to-Sum is configured to receive n pieces of private data by using the n TAs, compute a product of the n pieces of private data, decompose the product result into a sum of n random numbers, and output the n random numbers to the n TAs for continuing computation.

For example, when n=3, as shown in FIG. 11, TA 1 may first perform multiplication splitting computation on $S_{1,1}$, $S_{2,1},\ldots$, and $s_{m,1}$ received from the user equipment. In other words, multiplication splitting computation is performed through a polynomial $F(\ )=\Sigma_{j=0}^{h}a_{j}\Pi_{l=1}^{m}S_{l}^{b_{jl}}$ on data received by the TA.

Results obtained by TA 1 are: $F_{1,1}=a_1\ \Pi_{l=1}^{m}S_{l,1}^{b_{1,l}}$, $F_{1,2}=a_2\Pi_{l=1}^{m}S_{l,1}^{b_{2,l}},\ldots$, and $F_{1,h}=a_h\Pi_{l=1}^{m}S_{l,1}^{b_{h,l}}$.

Similar to the computation process of TA 1, results obtained by multiplication splitting computation performed by TA 2 on the data fragment sets $S_{1,2}, S_{2,2},\ldots$, and $S_{m,2}$ received by TA 2 may be: $F_{2,1}=a_1\ \Pi_{l=1}^{m}S_{l,2}^{b_{1,l}}$, $F_{2,2}=a_2\Pi_{l=1}^{m}S_{l,2}^{b_{2,l}},\ldots$, and $F_{2,h}=a_h\Pi_{l=1}^{m}S_{l,2}^{b_{h,l}}$.

Similar to the computation process of TA 1, results obtained by multiplication splitting computation performed by TA 3 on the data fragment sets $S_{1,3}, S_{2,3},\ldots$, and $S_{m,3}$ received by TA 3 may be: $F_{3,1}=a_1\Pi_{l=1}^{m}S_{l,3}^{b_{1,l}}$, $F_{3,2}=a_2\Pi_{l=1}^{m}S_{l,3}^{b_{2,l}},\ldots$, and $F_{3,h}=a_h\Pi_{l=1}^{m}S_{l,3}^{b_{h,l}}$.

Then, TA 1, TA 2, and TA 3 may respectively encrypt the obtained computation results and send the encrypted computation results to the trusted operator Prd-to-Sum for continuing computation. A computation process of the Prd-to-Sum may also be understood as two processes: multiplication aggregation and addition splitting. The multiplication aggregation may be understood as that the Prd-to-Sum performs multiplication operation in a mixed manner based on the computation results received from TA 1, TA 2, and TA 3. To be specific, the Prd-to-Sum multiplies the first result $F_{1,1}$ computed by TA 1, the first result $F_{2,1}$ computed by TA 2, and first result $F_{3,1}$ computed by TA 3 to obtain a product, and then performs addition splitting on the product. In other words, the product is split into three numbers added together. As shown in FIG. 11, it is assumed that the three numbers obtained through splitting and added together are represented as $\underline{F}_{1,1}$, $\underline{F}_{2,1}$, and $\underline{F}_{3,1}$.

Similarly, the Prd-to-Sum performs addition splitting on a product obtained by multiplying the second result $F_{1,2}$ computed by TA 1, the second result $F_{2,2}$ computed by TA 2, and the second result $F_{3,2}$ computed by TA 3. In other words, the product is split into three numbers added together. As shown in FIG. 11, it is assumed that the three numbers obtained through splitting and added together are represented as $\underline{F}_{1,2}$, $\underline{F}_{2,2}$, and $\underline{F}_{3,2}$.

By analogy, the Prd-to-Sum performs addition splitting on a product obtained by multiplying the $h^{th}$ result $F_{1,h}$ computed by TA 1, the $h^{th}$ result $F_{2,h}$ computed by TA 2, and the $h^{th}$ result $F_{3,h}$ computed by TA 3. In other words, the product is split into three numbers added together. As shown in FIG. 11, it is assumed that the three numbers obtained through splitting and added together are represented as $\underline{F}_{1,h}$, $\underline{F}_{2,h}$, and $\underline{F}_{3,h}$.

A computation process of the trusted operator Prd-to-Sum may be represented as $\Pi_{i=1}{}^{3}F_{i,j}=\Sigma_{i=1}{}^{3}\underline{F}_{i,j}$, where i represents a quantity of TAs. $\Pi_{i=1}{}^{3}F_{i,j}$ represents a product of three numbers of three TAs in a multiplication aggregation process, and $\Sigma_{i=1}{}^{3}\underline{F}_{i,j}$ represents three numbers added together that are obtained by splitting the product of three numbers.

When the Prd-to-Sum performs computation to obtain computation results $\underline{F}_{1,1}$, $\underline{F}_{2,1}$, and $\underline{F}_{3,1}$, $\underline{F}_{1,2}$, $\underline{F}_{2,2}$, and $\underline{F}_{3,2}$, . . . , $\underline{F}_{1,h}$, $\underline{F}_{2,h}$, and $\underline{F}_{3,h}$ after addition splitting, the computation results may be allocated and then sent to TA 1, TA 2, and TA 3 to continue computation. In this case, each of the three pieces of split data may be allocated to three TAs for computation. In other words, as shown in FIG. 11, the Prd-to-Sum sends $\underline{F}_{1,1}$, $\underline{F}_{1,2}$, . . . , and $\underline{F}_{1,h}$ encrypted by the Prd-to-Sum to TA 1 for continuing computation; sends $\underline{F}_{2,1}$, $\underline{F}_{2,2}$, . . . , and $\underline{F}_{2,h}$ encrypted by the Prd-to-Sum to TA 2 for continuing computation; and sends $\underline{F}_{3,1}$, $\underline{F}_{3,2}$, . . . , and $\underline{F}_{3,h}$ encrypted by the Prd-to-Sum to TA 3 for continuing computation.

Then, TA 1, TA 2, and TA 3 may respectively decrypt the received data and perform addition splitting computation, that is, add the received data. As shown in FIG. 11, TA 1 performs addition splitting computation, that is, adds received $\underline{F}_{1,1}$, $\underline{F}_{1,2}$, . . . , and $\underline{F}_{1,h}$ to obtain an addition splitting computation result $F_{1}=\Sigma_{j=0}{}^{h}a_{l}\underline{F}_{1,j}$; TA 2 performs addition splitting computation, that is, adds received $\underline{F}_{2,1}$, $\underline{F}_{2,2}$, . . . , and $\underline{F}_{2,h}$ to obtain an addition splitting computation result $F_{2}=\Sigma_{j=0}{}^{h}a_{l}\underline{F}_{2,j}$; and TA 3 performs addition splitting computation, that is, adds received $\underline{F}_{3,1}$, $\underline{F}_{3,2}$, . . . , and $\underline{F}_{3,h}$ to obtain an addition splitting computation result $F_{3}=\Sigma_{j=0}{}^{h}a_{l}\underline{F}_{3,j}$.

Finally, addition aggregation may be performed on $F_{1}$, $F_{2}$, and $F_{3}$. In other words, addition computation is performed to obtain a final computation result: $F=F_{1}+F_{2}+F_{3}$. In this case, the final computation result may be obtained by, for example, performing addition aggregation through $F_{3}$ based on $F_{1}$, $F_{2}$, and $F_{3}$ after TA 1 sends $F_{1}$ to TA 2, and then TA 2 sends $F_{1}$ and $F_{2}$ to $F_{3}$. Alternatively, addition aggregation may be implemented through $F_{1}$ or $F_{2}$, or in another manner. This is not limited in this application. The computation result of the same computation task in step 806 may be understood as F herein.

In this way, a process of collaborative computing of the plurality of TAs and the trusted operator is implemented.

In addition, it should be understood that computation functions of some computation tasks may need multi-layer addition and multiplication. In this case, results of all polynomials at a next layer may be used as input of a polynomial at a previous layer for computation. After addition and multiplication computation of each polynomial at the next layer are completed, an obtained result may be processed by another general trusted operator Sum-to-Prd and then input to a polynomial at the previous layer for computation. The trusted operator Sum-to-Prd herein may be configured to receive a plurality of pieces of private data, compute a sum of the plurality of pieces of private data, decompose the result into a product of a plurality of random numbers, and output the plurality of random numbers. It should be understood that, through the trusted operator Sum-to-Prd, a computation result of each polynomial at the next layer is split through multiplication splitting, and multiplication computation of the polynomial at the previous layer may be implemented.

Figure 12:
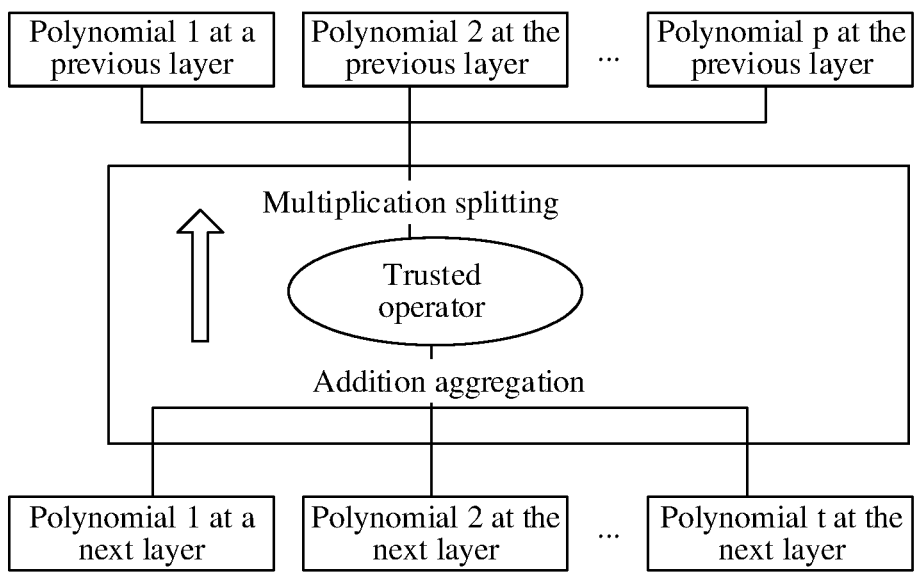
FIG. 12 is a schematic diagram of collaborative computing of a plurality of TAs and two trusted operators according to an embodiment of this application.

For example, as shown in FIG. 12, computation manners of polynomial 1 at the next layer, polynomial 2 at the next layer, . . . , and polynomial t (t is an integer greater than 1) at the next layer as well as polynomial 1 at the previous layer, polynomial 2 at the previous layer, . . . , and polynomial p (p is an integer greater than 1) at the previous layer, polynomial 1 at the next layer, polynomial 2 at the next layer, . . . , and polynomial t at the next layer in FIG. 12 are similar to a computation process of the polynomial F( ). A trusted operator in FIG. 12 may be the foregoing Sum-to-Prd.

Figure 13:
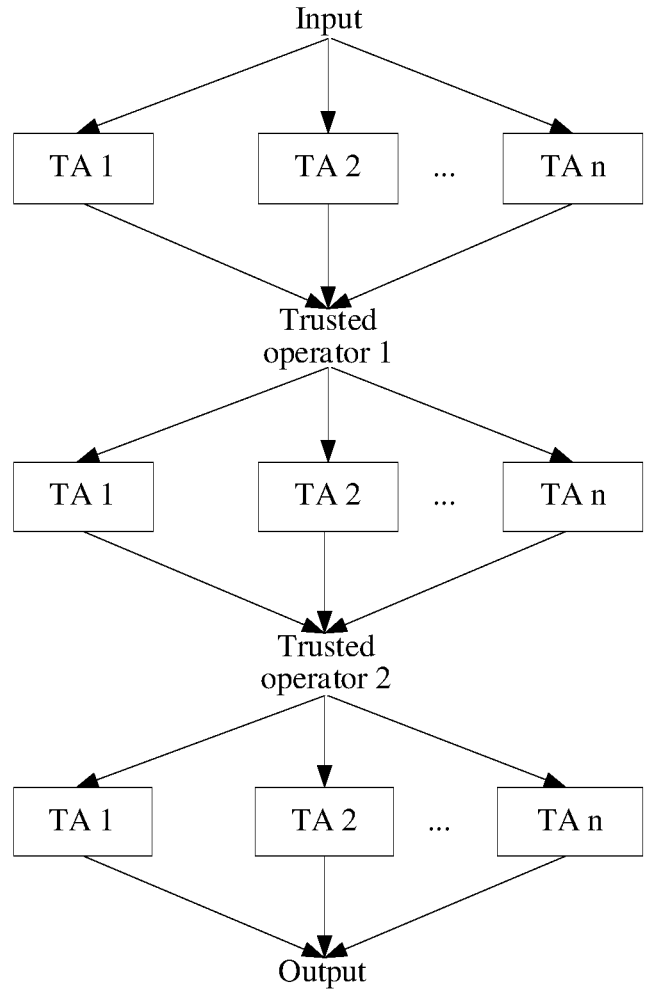
FIG. 13 is a schematic diagram of a computation process of a trusted computing node according to an embodiment of this application.

According to an example of the two trusted operators Prd-to-Sum and Sum-to-Prd in FIG. 11 and FIG. 12, if there are n TAs in the trusted computing node, a computing process of the trusted computing node may be, for example, a basic multi-party computation process shown in FIG. 13. It should be understood that, in FIG. 13, input is n pieces of data obtained through splitting by each of the m user equipments, and the n pieces of data of each of the m user equipments are sent to the trusted computing node. TA 1, TA 2, . . . , and TA n in the trusted computing node perform computation based on allocated data respectively to obtain a computation result 1, and send ciphertext 1 obtained by encrypting the computation result 1 to the trusted operator Prd-to-Sum (denoted as a trusted operator 1 in FIG. 13). The trusted operator Prd-to-Sum decrypts the received ciphertext to obtain the computation result 1, and continues to perform computation based on the computation result 1 to obtain a computation result 2. Ciphertext 2 obtained by encrypting the computation result 2 is allocated to TA 1, TA 2, . . . , and TA n. TA 1, TA 2, . . . , and TA n decrypt the received ciphertext 2 to obtain the computation result 2. TA 1, TA 2, . . . , and TA n continue to perform computation based on the computation result 2 to obtain a computation result 3, and send ciphertext 3 obtained by encrypting the computation result 3 to the trusted operator Sum-to-Prd (denoted as a trusted operator 2 in FIG. 13) for continuing computation. The trusted operator Sum-to-Prd decrypts the received ciphertext 3 to obtain a computation result 3, and continues to perform computation based on the computation result 3 to obtain a computation result 4, and allocates ciphertext 4 obtained by encrypting the computation result 4 to TA 1, TA 2, . . . , and TA n for continuing computation. TA 1, TA 2, . . . , and TA n decrypt the allocated ciphertext 4 to obtain a computation result 4, continue to perform computation based on the computation result 4, and output a final computation result of the computation task.

Therefore, in this application, in a process in which the plurality of TAs collaborate to complete secure multi-party computation in one TEE of the trusted computing node, cross-network communication interaction can be transferred from between a plurality of computing nodes in existing secure multi-party computation to between the plurality of TAs of a same trusted computing node. In comparison with computation in which a cryptography solution is used between a plurality of computing nodes, this application is simpler and more efficient. In addition, in this application, collaborative computing between the TA and the trusted operator may be implemented by using a general function splitting method, without relying on design of a specific function for a specific task. Therefore, universality is relatively high.

Figure 14:
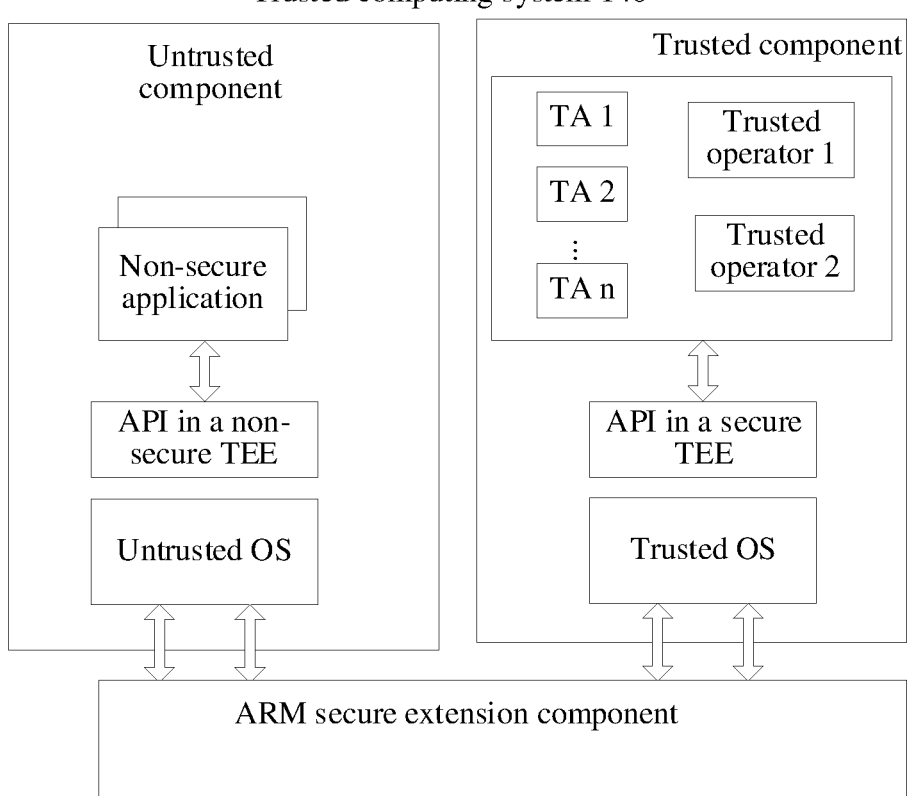
FIG. 14 is a schematic diagram of a structure of a trusted computing system used in a Trustzone of an ARM architecture according to an embodiment of this application.

Based on that the trusted computing node in this application includes the TEE, embodiments of this application are not only applicable to a TEE of an X86 architecture, for example, an SGX, but also applicable to a TEE of an ARM architecture, that is, a Trustzone. As shown in FIG. 14, if a plurality of TAs in this application are included in the Trustzone, plaintext computation of a data fragment used by each TA is considered as a function extension of ARM security (security).

As shown in FIG. 14, this application provides a trusted computing system 140. The trusted computing system includes a trusted component (secure world), an untrusted component (non-secure world), and an ARM secure extension component (security extensions).

The untrusted component includes a non-secure application (which may also be referred to as normal APP), an API (which may also be referred to as a client TEE API) in a non-secure TEE, and an untrusted OS (which may also be referred to as a rich OS). Therefore, the untrusted component here may be considered as an execution environment outside the TEE. The trusted component may be considered as an environment in the TEE.

The trusted component includes n secure applications (for example, TA 1, TA 2, . . . , TA n, and the trusted operator 1 and the trusted operator 2 shown in FIG. 14), an API in a secure TEE, and a trusted OS. The secure application is configured to call the API in the secure TEE corresponding to the trusted OS, so that the trusted OS executes a command of the secure application. The n secure applications may be understood as n TAs and trusted operators in this application.

In embodiments of this application, the trusted OS is configured to: determine n trusted applications TAs for a same computation task of m users, where m is an integer greater than or equal to 1, and n is an integer greater than 1; receive data sent by each of the m user equipments, where the data sent by each user equipment is used for performing the same computation task; determine a data fragment set of each TA of the n TAs participating in the computation, where the data fragment set of each TA includes one data fragment in the data sent by each user equipment; control each TA to perform computation based on the data fragment set of each TA, and determine a computation result of the same computation task based on a computation result of each TA; and control each TA to perform computation based on the data fragment set of each TA, and determine a computation result of the same computation task based on a computation result of each TA.

For a specific implementation process of the trusted OS in this application, refer to the foregoing descriptions of FIG. 5 to FIG. 13. Beneficial effects that can be achieved by the trusted OS are the same as those in the foregoing data security processing method.

It may be understood that, to implement the foregoing functions, the electronic device includes a corresponding hardware and/or software module for performing each function. In combination with example algorithm steps described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in this embodiment, the division into the modules is an example, is merely logical function division, and may be other division during actual implementation.

Figure 15:
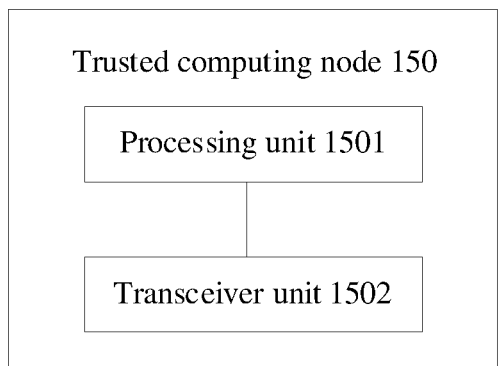
FIG. 15 is a schematic diagram of a structure of a trusted computing node according to an embodiment of this application.

When each functional module corresponding to each function is obtained through division, FIG. 15 is a schematic diagram of possible composition of a trusted computing node 150 in the foregoing embodiments. The trusted computing node in FIG. 15 may be the trusted computing node in embodiments in FIG. 6 to FIG. 13. The trusted computing node 150 may include a processing unit 1501 and a transceiver unit 1502.

The processing unit 1501 may be configured to support the trusted computing node 150 in performing step 701, step 703, step 704, step 802, step 804, step 805, step 806, and the like, and/or another process of the technology described in this specification.

The transceiver unit 1502 may be configured to support the trusted computing node 150 in performing step 702, step 801, and the like, and/or another process of the technology described in this specification.

It should be noted that all related content of the steps in the foregoing method embodiments may be cited in function description of corresponding functional modules. Details are not described herein again.

The trusted computing node 150 provided in this embodiment is configured to execute the foregoing data security processing method, and therefore can achieve a same effect as the foregoing implementation method.

When an integrated unit is used, the trusted computing node 150 may include a processing module, a storage module, and a communication module. The processing module may be configured to control and manage an action of the trusted computing node 150, for example, support the trusted computing node 150 in performing the steps performed by the processing unit 1501. The storage module may be configured to support the trusted computing node 150 in storing program code, data, and the like. The communication module may be configured to support the trusted computing node 150 in communicating with other devices, for example, communicating with a plurality of user equipment.

In some embodiments, the processing module in this application may include the trusted operators in this application. An example in which the trusted operators in this application are the trusted operator 1: Prd-to-Sum and the trusted operator 2: Sum-to-Prd is used. Because communication between the trusted operator and the plurality of TAs may be encrypted for execution, as shown in (a) in FIG. 16, an internal structure of the trusted operator 1 may include a decryption module, a key management module, an encryption module, and a multiplication and addition-subtraction random number module. The decryption module is configured to decrypt, by the trusted operator 1, a computation result received from a plurality of TAs, that is, ciphertext of a product obtained by splitting from TAs (for example, ciphertexts of $F_{1,1}$, $F_{2,1}$, $F_{3,1}$ and the like in the foregoing descriptions are decrypted to obtain $F_{1,1}$, $F_{2,1}$, $F_{3,1}$), to obtain input of the product obtained through splitting. The multiplication and addition-subtraction random number module is configured to perform multiplication aggregation on the received data to obtain a product $\Pi_{i=1}{}^3 F_{i,j}$ (that is, perform multiplication aggregation to compute a product), and then perform addition splitting on the product to split the product into a sum of random numbers, $\Sigma_{i=1}{}^3 F_{i,j'}$, for output. The encryption module is configured to encrypt the sum of the random numbers and send the sum to the plurality of TAs for continuing computation. The key management module is configured to allocate keys to the decryption module and the encryption module.

Figure 16:
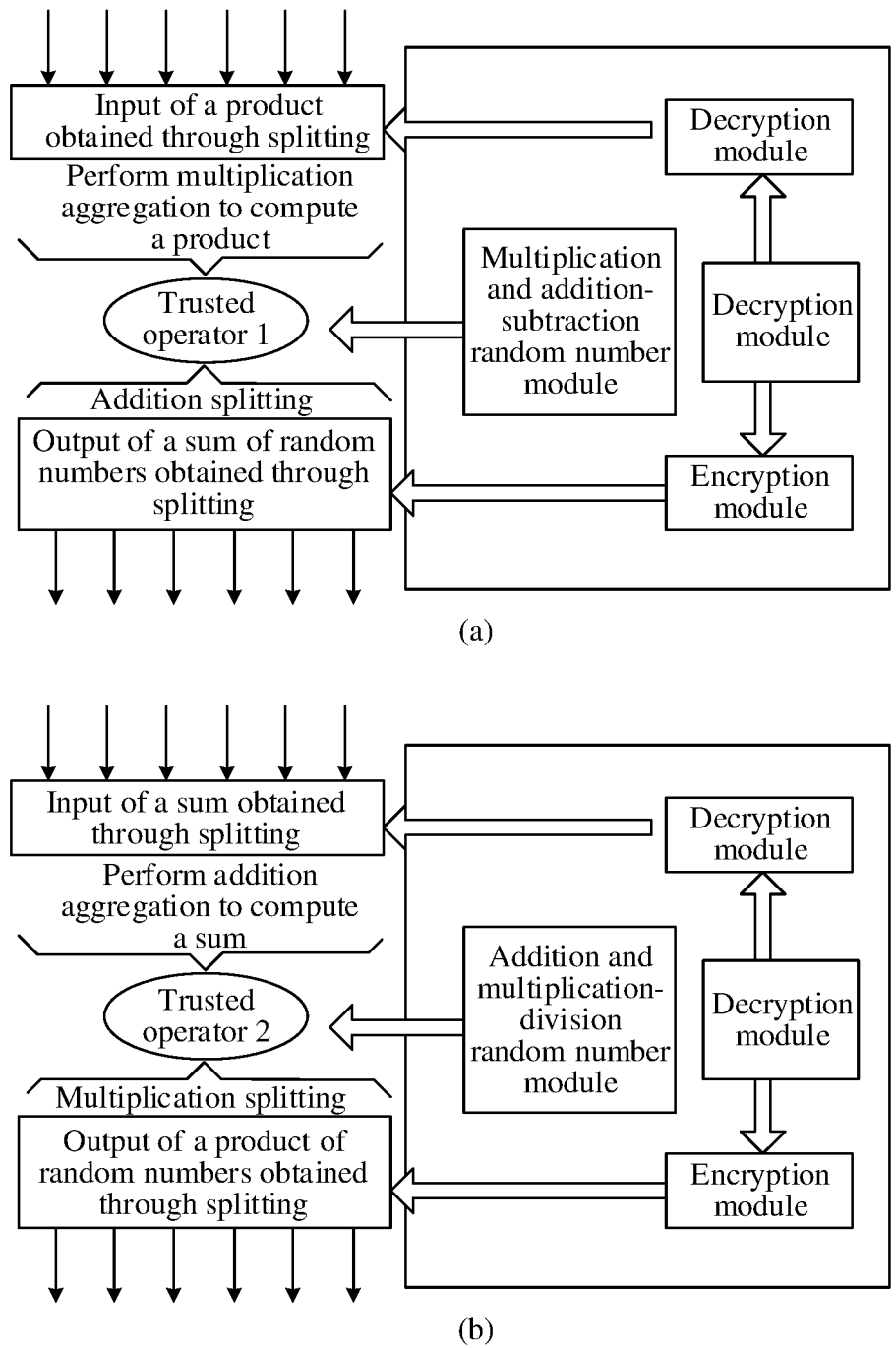
FIG. 16 is a schematic diagram of a structure of a trusted operator according to an embodiment of this application.

As shown in (b) in FIG. 16, an internal structure of the trusted operator 2 may include a decryption module, a key management module, an encryption module, and an addition and multiplication-division random number module. The decryption module is configured to decrypt, by the trusted operator 1, ciphertext of a data sum obtained by splitting from a plurality of TAs, to obtain a plurality of pieces of data. The addition and multiplication-division random number module is configured to perform addition aggregation on the received plurality of pieces of data to compute a sum, and then perform multiplication splitting on the computed sum to split the sum into a product of random numbers for output. The encryption module is configured to encrypt the product of the random numbers and output the product to the plurality of TAs for continuing computation. The key management module is configured to allocate keys to the decryption module and the encryption module.

Figure 17:
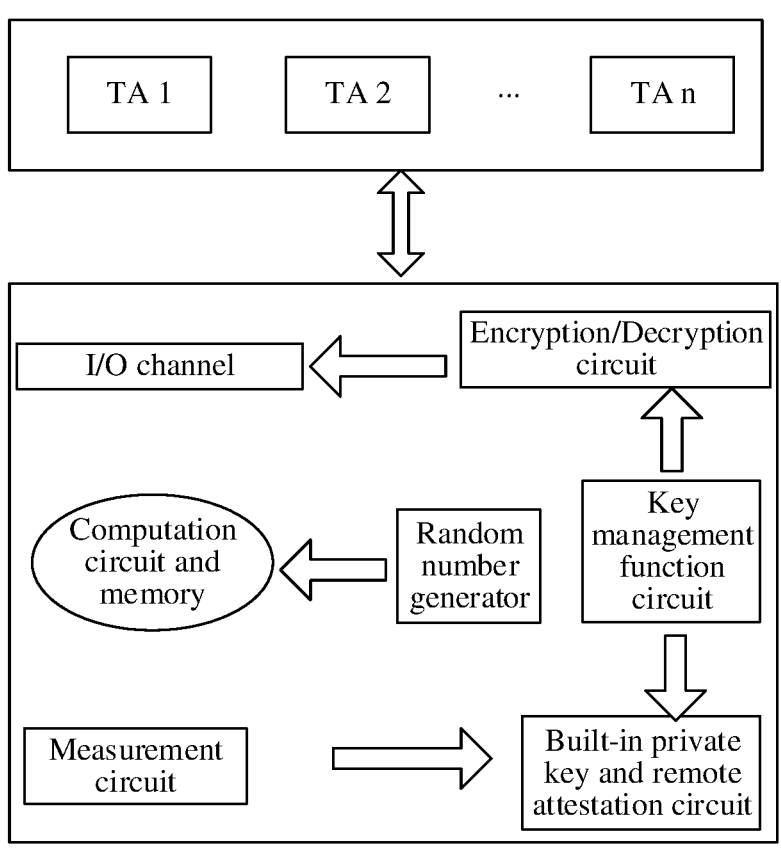
FIG. 17 is a schematic diagram of a hardware structure of a trusted operator according to an embodiment of this application.

In some embodiments, the trusted operator may be packaged in a hardware chip similar to a tamper-resistant chip, so that it can be ensured that a confidential operation in the trusted operator is not leaked, and damage of data privacy is avoided. A measurement and remote attestation process may be further added to the hardware chip, so that correctness and integrity of implementation of an algorithm of the trusted operator can be verified. In this way, a hardware implementation of the trusted operator may be shown in FIG. 17. The trusted operator includes an I/O channel, an encryption/decryption module, a key management function, a random number generator, a built-in private key, a remote attestation circuit, and a measurement circuit.

The I/O channel may be configured to receive data from a plurality of TAs (TA 1, TA 2, . . . , TA n in FIG. 16), and send data to the plurality of TAs.

The encryption/decryption circuit may be configured to decrypt received data (for example, the input of the product obtained through splitting and the input of the sum obtained through splitting in FIG. 16), and encrypt to-be-sent data (for example, the output of the sum of the random numbers obtained through splitting and the output of the product of the random numbers obtained through splitting in FIG. 16).

The key management function circuit may be adapted to configure a key used by the encryption/decryption module.

The random number generator may be configured to implement a self-owned operation function of the trusted operator, including a computation circuit and a memory. The computation circuit and the memory may be, for example, configured to implement the multiplication aggregation to compute a product, the addition splitting, the addition aggregation to compute a sum, the multiplication splitting, and the like in FIG. 16.

The built-in private key, the remote attestation circuit, and the measurement circuit are configured to measure a remote attestation request for the trusted operator from user equipment, to obtain a measurement result.

In addition, in embodiments of this application, the processing module may be a processor or a controller. The processor may implement or perform various example logical blocks, modules, and circuits described with reference to content disclosed in this application. The processor may alternatively be a combination for implementing a computation function, for example, a combination including one or more microprocessors or a combination of a digital signal processor (digital signal processor, DSP) and a microprocessor. The storage module may be a memory. The communication module may be specifically a device that interacts with another electronic device (for example, the user equipment in this application), such as a radio frequency circuit, a Bluetooth chip, or a Wi-Fi chip.

Figure 18:
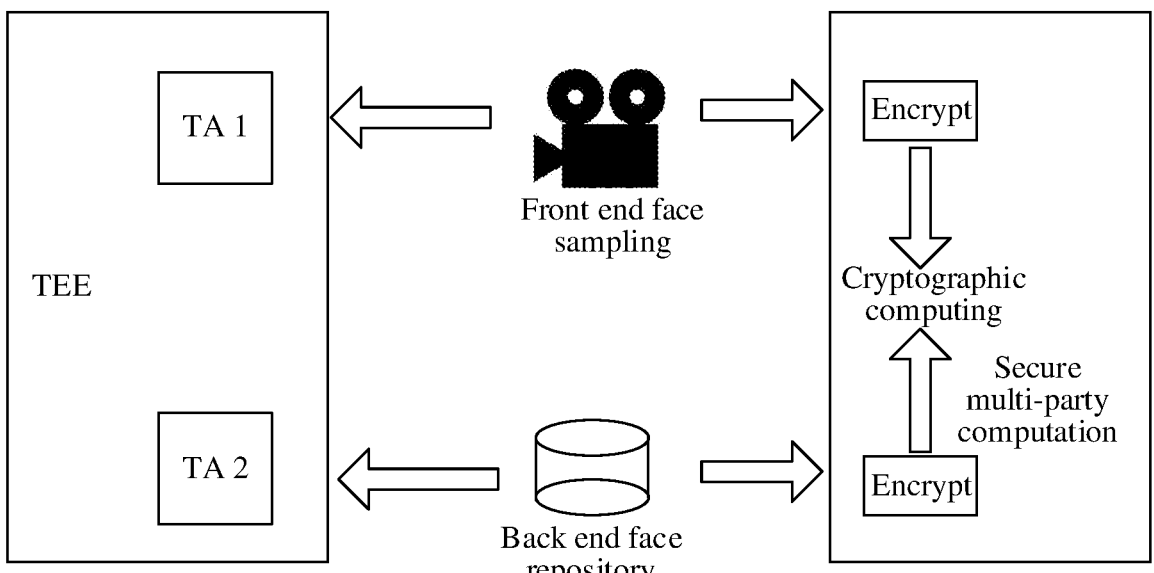
FIG. 18 is a schematic diagram of an application scenario according to an embodiment of this application.

The data security processing method provided in this application may be applied to a plurality of application scenarios, such as a confidential facial recognition scenario as shown in FIG. 18. In this scenario, two user equipments are included: a camera device used for front end face sampling, a back end face repository, and a trusted computing node. The computation task in this application may be understood as determining whether the back end face repository stores face information sampled by the camera device used for front end face sampling. In this case, the camera device may split the face information into n pieces and send the n pieces to the trusted computing node. The back end face repository may randomly split face sample data stored in a back end into n pieces, encrypt the n pieces, and transmit the n pieces to the trusted computing node. It is assumed that two sub-tasks, that is, two TAs: TA 1 and TA 2 are configured in a TEE of the trusted computing node, where n=2. The trusted computing node may allocate the two pieces of data corresponding to the face information to TA 1 and TA 2, and allocate the two pieces of data sent by the back end face repository to TA 1 and TA 2. A computation result of whether the back end face repository stores the face information sampled by the camera device may be obtained through computation of TA 1, TA 2, and the trusted operator.

Figure 19:
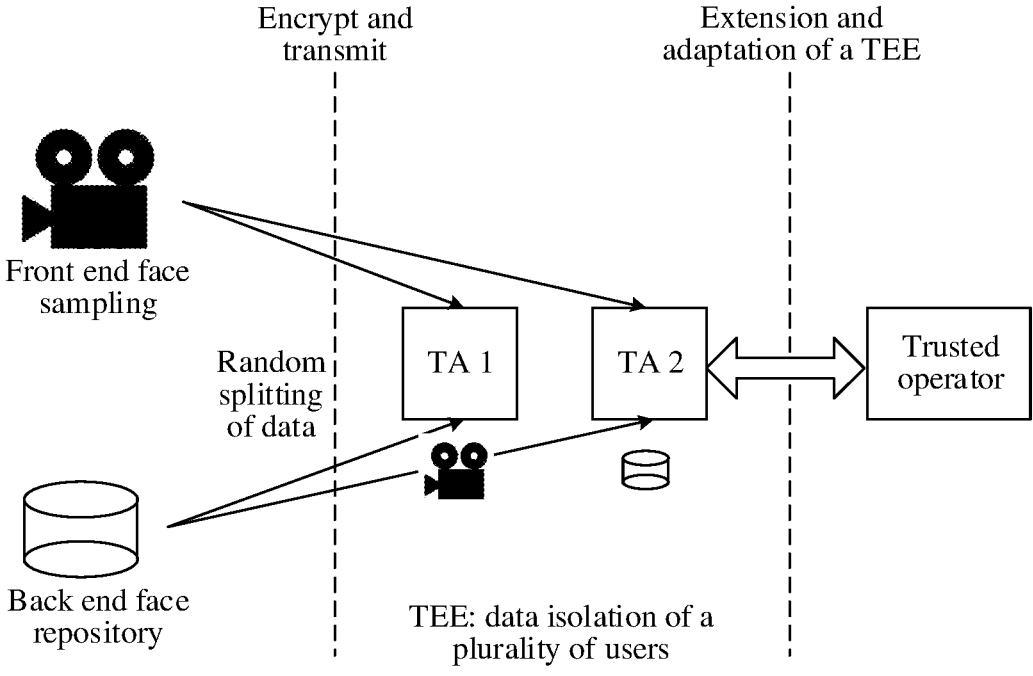
FIG. 19 is a schematic diagram of an application scenario according to an embodiment of this application.

In an embodiment, based on FIG. 18, as shown in FIG. 19, in this application, when data isolation of a plurality of users is implemented in the TEE of the trusted computing node, the camera device and the back end face repository may each control a TA. For example, the camera device serves as a computation participant to control TA 1, and the back end face repository may serve as a computation participant to control TA 2. In this way, if TA computation controlled by the camera device or the back end face repository stops, it can be ensured that data is not leaked. FIG. 19 further shows an extension and adaptation function of the TEE. That is, TA 1 and TA 2 perform collaborative computing with the trusted operator.

In comparison with conventional secure multi-party computation, a camera device and a back end face repository serve as both a data provider and a computation participant. The camera device and the back end face repository need to compute face data and back end face data and then perform encrypted communication. This is a type of cryptographic computing for multi-party user communication. Communication costs are relatively high, and the computing efficiency is relatively low. However, in this application, data of a plurality of users only needs to be computed in a trusted computing node, and each TA obtains only a part of data of each user. Therefore, data leakage is less likely to occur, and computing efficiency is high.

Embodiments of this application further provide an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps, to implement the data security processing method in the foregoing embodiments.

Embodiments of this application further provide a computer storage medium. The computer storage medium stores computer instructions. When the computer instructions are run on an electronic device, the electronic device is enabled to perform the foregoing related method steps to implement the data security processing method in the foregoing embodiments.

Embodiments of this application further provide a computer program product. When the computer program product runs on a computer, the computer is enabled to perform the foregoing related steps to implement the data security processing method performed by the electronic device in the foregoing embodiments.

In addition, embodiments of this application further provide an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the data security processing method performed by the electronic device in the foregoing method embodiments.

The electronic device, the computer storage medium, the computer program product, or the chip provided in this embodiment is configured to perform the corresponding method provided above and therefore, can achieve beneficial effects that can be referred to the beneficial effects of the corresponding method provided above. Details are not described herein again.

Another embodiment of this application provides a system. The system may include the foregoing trusted computing node and the foregoing at least one user equipment, and may be configured to implement the foregoing data security processing method.

Based on descriptions about the foregoing implementations, a person skilled in the art may understand that, for a purpose of convenient and brief description, division into the foregoing functional modules is used as an example for illustration. In actual application, the foregoing functions may be allocated to different functional modules and implemented according to a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solution of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solution of this application essentially, or the part contributing to the conventional technologies, or all or some of the technical solution may be implemented in the form of a software product. The software product is stored in a storage medium and includes several instructions for enabling a device (which may be a single-chip microcomputer, a chip or the like) or a processor (processor) to perform all or some of the steps of the method described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A data security processing method, comprising:

receiving, by a trusted computing node, a trusted computing request from m pieces of user equipment, where the trusted computing request indicates a same computation task of the m pieces of user equipment, and m is an integer greater than or equal to 1;

in response to receiving the trusted computing request, determining, by the trusted computing node, n trusted applications (TAs) for the same computation task of the m pieces of user equipment, wherein n is an integer greater than 1;

receiving, by the trusted computing node via encrypted communication, data sent by each of the m pieces of user equipment, wherein the data sent by each user equipment is used for performing the same computation task;

allocating, by the trusted computing node and based on the data sent by each user equipment, a data fragment set for each TA of the n TAs participating in the computation, wherein the data fragment set of each TA comprises one data fragment in the data sent by each user equipment;

controlling, by the trusted computing node, each TA to perform computation based on the data fragment set of each TA; and determining, by the trusted computing node, a computation result of the same computation task based on a computation result of each TA.

2. The data security processing method according to claim 1, wherein:

the data sent by each user equipment comprises n data fragments, and the data fragment set of each TA comprises one of the n data fragments sent by each user equipment.

3. The data security processing method according to claim 1, wherein:

computing logic is the same for each of the n TAs.

4. The data security processing method according to claim 1, wherein controlling, by the trusted computing node, each TA to perform computation based on the data fragment set of each TA comprises:

controlling, by the trusted computing node, each TA to perform computation on the data fragment set of each TA;

controlling, by the trusted computing node, each TA to output an intermediate computation result of each TA to a trusted operator for continuing computation; and controlling, by the trusted computing node, the trusted operator to output an intermediate computation result of the trusted operator to each TA for continuing computation, to obtain the computation result of each TA.

5. The data security processing method according to claim 4, wherein controlling each TA to output the intermediate computation result of each TA to the trusted operator for continuing computation comprises:

controlling, by the trusted computing node, each TA to encrypt the computation result of each TA to obtain the intermediate computation result of each TA;

controlling, by the trusted computing node, each TA to output the intermediate computation result of each TA to the trusted operator; and controlling, by the trusted computing node, the trusted operator to decrypt the intermediate computation result of each TA, to control the trusted operator to continue computation based on a decrypted computation result of each TA; and controlling, by the trusted computing node, the trusted operator to output the intermediate computation result of the trusted operator to each TA for continuing computation, to obtain the computation result of each TA comprises:

controlling, by the trusted computing node, the trusted operator to encrypt a computation result of the trusted operator to obtain the intermediate computation result of the trusted operator;

outputting, by the trusted computing node, the intermediate computation result of the trusted operator to each TA; and controlling, by the trusted computing node, each TA to decrypt the intermediate computation result of the trusted operator, to control each TA to continue computation based on a decrypted computation result of the trusted operator, so as to obtain the computation result of each TA.

6. The data security processing method according to claim 2, wherein:

each user equipment is configured to perform algorithm integrity verification on the n TAs.

7. The data security processing method according to claim 6, wherein before receiving, by the trusted computing node, the data sent by each of the m pieces of user equipment, the method further comprises:

receiving, by the trusted computing node, remote attestation requests respectively sent by the m pieces of user equipment, wherein the remote attestation requests are used for requesting verification on the n TAs; and sending, by the trusted computing node, to each of the m pieces of user equipment, measurement results respectively corresponding to the n TAs, wherein a measurement result corresponding to each of the n TAs comprises a node parameter of hardware and a hash value of a software program that correspond to each TA, the measurement results respectively corresponding to the n TAs are used by each user equipment to verify whether the n TAs are tampered with, and each user equipment sends the n data fragments to the trusted computing node when the verification succeeds.

8. A trusted computing system, wherein the trusted computing system comprises:

a trusted component, an untrusted component, and a secure extension component, wherein:

the untrusted component comprises a non-secure application, an application programming interface (API) in a non-secure trusted execution environment (TEE), and an untrusted operating system (OS);

the trusted component comprises n secure applications, an API in a secure TEE, and a trusted OS; wherein:

each of the n secure applications is configured to call the API in the secure TEE corresponding to the trusted OS, wherein the trusted OS executes a command of the secure application; and the trusted OS is configured to:

receive a trusted computing request from m pieces of user equipment, where the trusted computing request indicates a same computation task of the m pieces of user equipment, and m is an integer greater than or equal to 1;

in response to receiving the trusted computing request, determine n trusted applications (TAs) for the same computation task of the m pieces of user equipment, wherein n is an integer greater than 1;

receive, via encrypted communication, data sent by each of the m pieces of user equipment, wherein the data sent by each user equipment is used for performing the same computation task;

allocate, based on the data sent by each user equipment, a data fragment set for each TA of the n TAs participating in the computation, wherein the data fragment set of each TA comprises one data fragment in the data sent by each user equipment;

control each TA to perform computation based on the data fragment set of each TA; and determine a computation result of the same computation task based on a computation result of each TA.

9. The trusted computing system according to claim 8, wherein the data sent by each user equipment comprises n data fragments, and the data fragment set of each TA comprises one of the n data fragments sent by each user equipment.

10. The trusted computing system according to claim 8, wherein computing logic is the same for each of the n TAs.

11. The trusted computing system according to claim 8, wherein the trusted OS is configured to:

control each TA to perform computation on the data fragment set of each TA;

control each TA to output an intermediate computation result of each TA to a trusted operator for continuing computation; and control the trusted operator to output an intermediate computation result of the trusted operator to each TA for continuing computation, to obtain the computation result of each TA.

12. The trusted computing system according to claim 11, wherein the trusted OS is configured to:

control each TA to encrypt the computation result of each TA to obtain the intermediate computation result of each TA, control each TA to output the intermediate computation result of each TA to the trusted operator, and control the trusted operator to decrypt the intermediate computation result of each TA, to control the trusted operator to continue computation based on a decrypted computation result of each TA; and controlling the trusted operator to output the intermediate computation result of the trusted operator to each TA for continuing computation, to obtain the computation result of each TA comprises:

controlling the trusted operator to encrypt a computation result of the trusted operator to obtain the intermediate computation result of the trusted operator;

outputting the intermediate computation result of the trusted operator to each TA; and controlling each TA to decrypt the intermediate computation result of the trusted operator, to control each TA to continue computation based on a decrypted computation result of the trusted operator, so as to obtain the computation result of each TA.

13. The trusted computing system according to claim 9, wherein each user equipment is configured to perform algorithm integrity verification on the n TAs.

14. The trusted computing system according to claim 13, wherein the trusted OS is further configured to:

receive remote attestation requests respectively sent by the m pieces of user equipment, wherein the remote attestation requests are used for requesting verification on the n TAs; and send, to each of the m pieces of user equipment, measurement results respectively corresponding to the n TAs, wherein a measurement result corresponding to each of the n TAs comprises a node parameter of hardware and a hash value of a software program that correspond to each TA, the measurement results respectively corresponding to the n TAs are used by each user equipment to verify whether the n TAs are tampered with, and each user equipment sends the n data fragments to the trusted computing system when the verification succeeds.

\* \* \* \* \*